United States Patent [19]

Plunkett, Jr.

[11] 4,303,998

[45] Dec. 1, 1981

[54] DICTATION RECORDING SYSTEM

[75] Inventor: Luther C. Plunkett, Jr., Atlanta, Ga.

[73] Assignee: Lanier Business Products, Inc., Atlanta, Ga.

[21] Appl. No.: 923,178

[22] Filed: Jul. 10, 1978

Related U.S. Application Data

[63] Continuation of Ser. No. 756,387, Jan. 3, 1977, abandoned.

[51] Int. Cl.³ .................. G11B 5/00; G11B 27/36
[52] U.S. Cl. .................. 369/29; 179/6.09; 179/6.17
[58] Field of Search ........... 179/100.1 DR, 6 C, 6.17, 179/6.09; 369/29, 25; 360/31

[56] References Cited

U.S. PATENT DOCUMENTS

| 3,648,249 | 3/1972 | Goldsberry | 179/100.1 DR |
| 3,705,961 | 12/1972 | Nye | 179/100.1 DR |
| 3,835,261 | 9/1974 | Maty | 179/100.1 DR |
| 3,879,751 | 4/1975 | Gimelli | 360/31 |
| 3,965,484 | 6/1976 | Maty | 179/100.1 DR |
| 3,984,644 | 10/1976 | Maty | 179/100.1 DR |

Primary Examiner—Alan Faber
Attorney, Agent, or Firm—Jones, Thomas & Askew

[57] ABSTRACT

A recording system for recording dictation originating at a plurality of dictate stations with a plurality of recorders and which provides for communication and monitoring functions between the dictate stations and a central control unit. In addition, the recording system provides for communication and monitoring functions between the central control unit and a plurality of transcriber stations at which the transcribing of dictation from a plurality of recorders is occurring. The monitoring functions include the monitoring of dictation being recorded by a selected recorder and of dictation being transcribed from a selected recorder and the communication functions include communication between a selected dictate station or a selected transcriber station and the central control unit.

24 Claims, 6 Drawing Figures

Fig_1

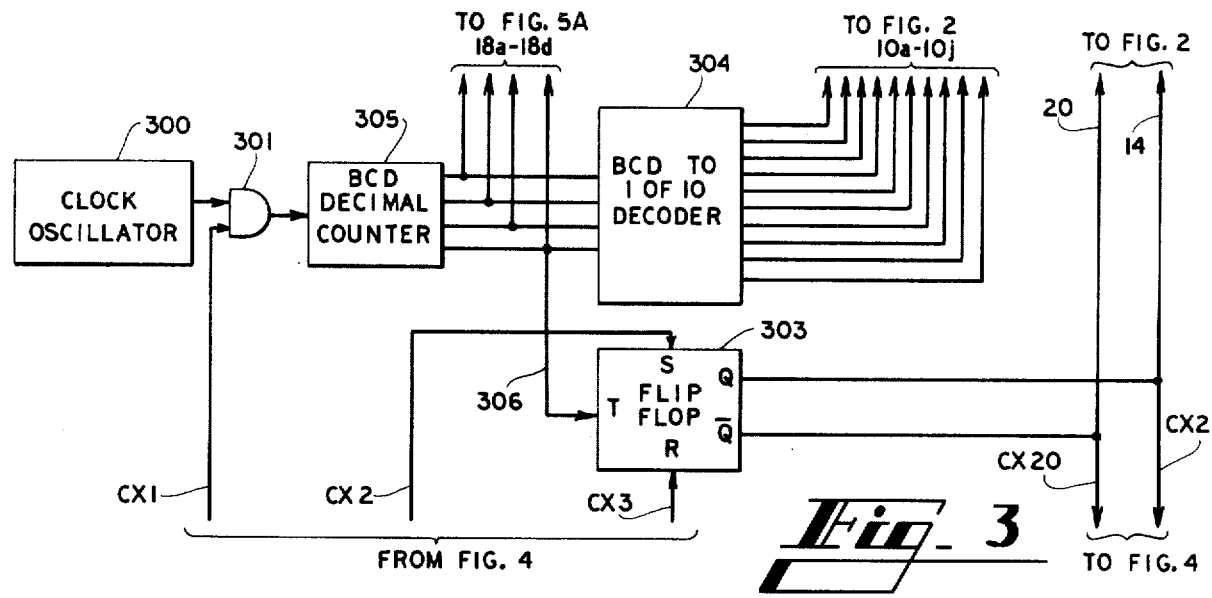
Fig. 3
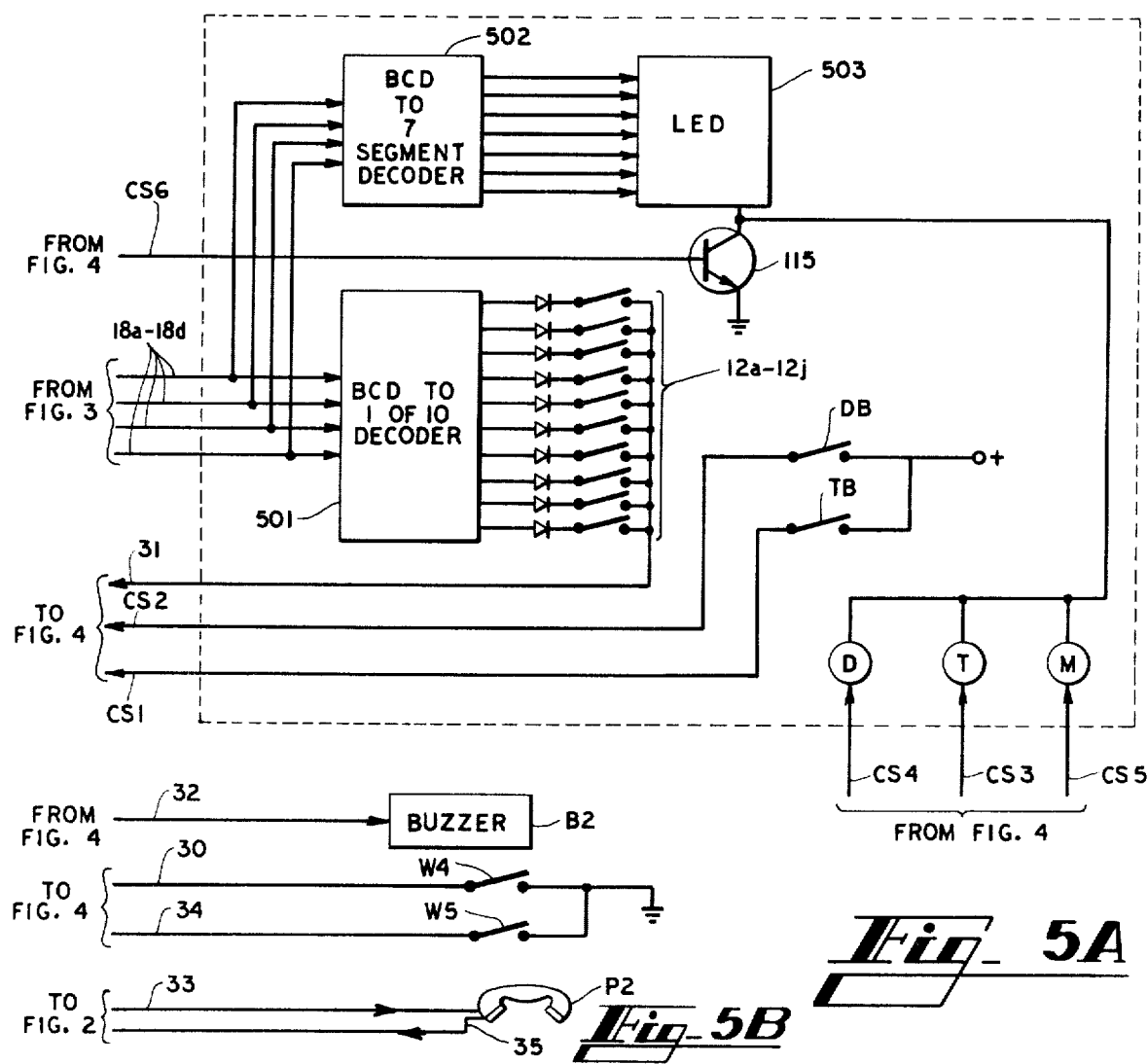
Fig. 5A
Fig. 5B

DICTATION RECORDING SYSTEM

This is a continuation of application Ser. No. 756,387, filed Jan. 3, 1977, now abandoned.

BACKGROUND OF THE INVENTION

1. Field of the Invention

This invention relates to recording systems and more particularly to a recording system having a plurality of dictate stations for the recording of dictation with a plurality of recorders, a plurality of transcriber stations for the transcribing of dictation from a plurality of recorders, and a central control unit at which the recording or transcribing of dictation can be monitored or assisted.

2. Brief Description of the Prior Art

Recording systems having a plurality of recorders at a central location for recording dictation from a plurality of dictate stations at locations remote from the central location are known in the prior art. It is also known in the prior art to provide a central control unit at the central location which enables an individual to observe and assist with the operation of the plurality of recorders as dictation is being recorded.

In addition, it is known in the prior art for such a central control unit to enable an individual to observe and assist with a plurality of recorders as dictation is being transcribed at a plurality of transcriber stations which may either be at the central location or at locations remote from the central location. However, many problems have been encountered with these prior art recording systems.

One problem which has been encountered is that these prior art recording systems have provided for communication between a dictate station and the central control unit or between a transcriber station and the central control unit only with a communication system which is separate and independent of the recording system. A second problem which has been encountered with these prior art recording systems is that the monitoring of dictation as it is being recorded by a recorder or being transcribed from a recorder has generally not been possible and where possible, it has been accomplished at the risk of interfering with the recording or transcribing of dictation. A third problem which has been encountered is that it has been impossible for dictation being transcribed at a transcriber station to be heard simultaneously at the transcriber station and the central control unit while the transcriber station and central control unit are in communication so that assistance can be conveniently rendered from the central control unit with respect to the interpretation of the dictation.

A fourth problem which has been encountered with these prior art recording systems is that they have not provided for the recording of instructions on a recorder from the central control unit. A fifth and further problem which has been encountered with these prior art recording systems is that in spite of the limited communication and monitoring functions provided by them, the central control units have been large, cumbersome to operate, and relatively expensive.

SUMMARY OF THE INVENTION

The invention disclosed herein overcomes these and other problems which have been encountered with prior art recording systems in which a central control unit is provided to enable an individual to observe or assist with the operation of a plurality of recorders which are being used for the recording of dictation from a plurality of remotely located dictate stations or for the transcribing of dictation from a plurality of transcribing stations. This is because the invention is a recording system which selectively provides each of a plurality of communication and monitoring functions between a central control unit and each of a plurality of dictate stations, transcriber stations, and recorders by using the audio and control circuits of the dictate stations and the recorders. Moreover, the invention provides for dictation being transcribed at a transcriber station to be simultaneously heard at the transcriber station and the central control unit either in combination with or not in combination with simultaneous communication between the transcriber station and the central control unit.

Furthermore, the invention disclosed herein provides these communication and monitoring functions without interfering with the dictating of dictation from a dictate station or with the transcribing of dictation by a transcriber station. Among the many communication and monitoring functions provided by the invention in this manner is the recording of instructions on a recorder from the central recording unit.

Moreover, although the invention disclosed is particularly well-suited to a recording system in which a plurality of recorders are at central location adjacent the central control unit, the invention is also equally well-suited to a recording system in which the recorders, as well as dictate stations and transcriber stations, are at any of a variety of different locations relative to the central control unit. In addition, the invention disclosed herein provides many communication and monitoring functions provided by it with apparatus which is small and compact, easy to operate, and relatively inexpensive.

These improvements in a recording system are provided by a recording system having a central control unit and a plurality of channel units. Each of the channel units is operatively connected directly to a particular transcriber station and to a particular recorder and is operatively connected either directly to a particular dictate station or indirectly to any of a plurality of dictate stations through a conventional recorder selecting device by which a dictate station selects an available recorder on the basis of a criterion such as availability or priority.

In addition, the recording system includes a function conditioning means for successively and alternately conditioning the recording system for particular communication or monitoring functions with respect to the dictate stations, the recorders, or the transcriber stations associated with particular channel units; a plurality of function selecting means for selecting a communication or monitoring function of the recording system involving the dictate station, recorder, or transcriber station associated with a particular channel unit when the recorder system is conditioned for the particular communication or monitoring function by the conditioning means; a function enabling means responsive to a function selecting means for rendering the recording system operative to provide the particular communication or monitoring function selected by the function selecting means; and a function control means for initiating and controlling the various aspects of a particular communication or monitoring function while the recording system is being rendered operative by the function enabling means to provide the particular communication or monitoring function.

The recording system also includes a signaling means responsive to the recording system being rendered operative for a particular communication or monitoring function for providing a signal, such as an audible or visual signal, to indicate that the particular communication or monitoring function has been selected; a function disabling means for rendering the recording system inoperative for the selecting or enabling of any communication or monitoring function when the central control unit is unattended or when for some other reason the originating of a communication function from a dictate station or transcriber station is inappropriate; and a busy signal means responsive to the function enabling means or the function disabling means being operative when a function selecting means is operated for providing a busy signal to the dictate station or transcriber station at which the function selecting means is operated.

Furthermore, the recording system includes a function altering means for causing the function enabling means to enable a monitoring function rather than a selected communication function when the selected communication function would disrupt the recording of dictation; and a reset means for rendering the function enabling means inoperative when a communication function selected and enabled does not occur or when a communication or monitoring function selected and enabled has occurred and been completed.

Moreover, in addition to the various other means provided for initiating and controlling particular aspects of particular communication or monitoring functions described herein, the function control means includes a signal altering means for changing the signal provided by the function signaling means to indicate that a communication or monitoring function has been initiated; a recorder disabling means for placing a recorder in a standby condition in which dictation or communication between a dictate station and the central control unit cannot be recorded; and a communication enabling means for enabling communication between a dictate station and the central control unit only when the recorder disabling means is operative and for alternately enabling the recording of dictation with a recorder from the central control unit when the recorder disabling means is not operative.

DESCRIPTION OF THE DRAWING

These and other features and advantages of the invention will be more clearly understood from the following detailed description and the accompanying drawing in which:

FIG. 3 is a circuit diagram of the function conditioning and enabling device in the embodiment of the invention in FIG. 1;

FIGS. 5A and 5B are circuit diagrams showing in more detail the central control unit in the embodiment of the invention shown in FIG. 1.

DESCRIPTION OF AN EMBODIMENT

These figures and the following detailed description disclose a specific embodiment of the invention. However, it will be understood that the invention may be embodied in other equivalent forms.

Figure 1:
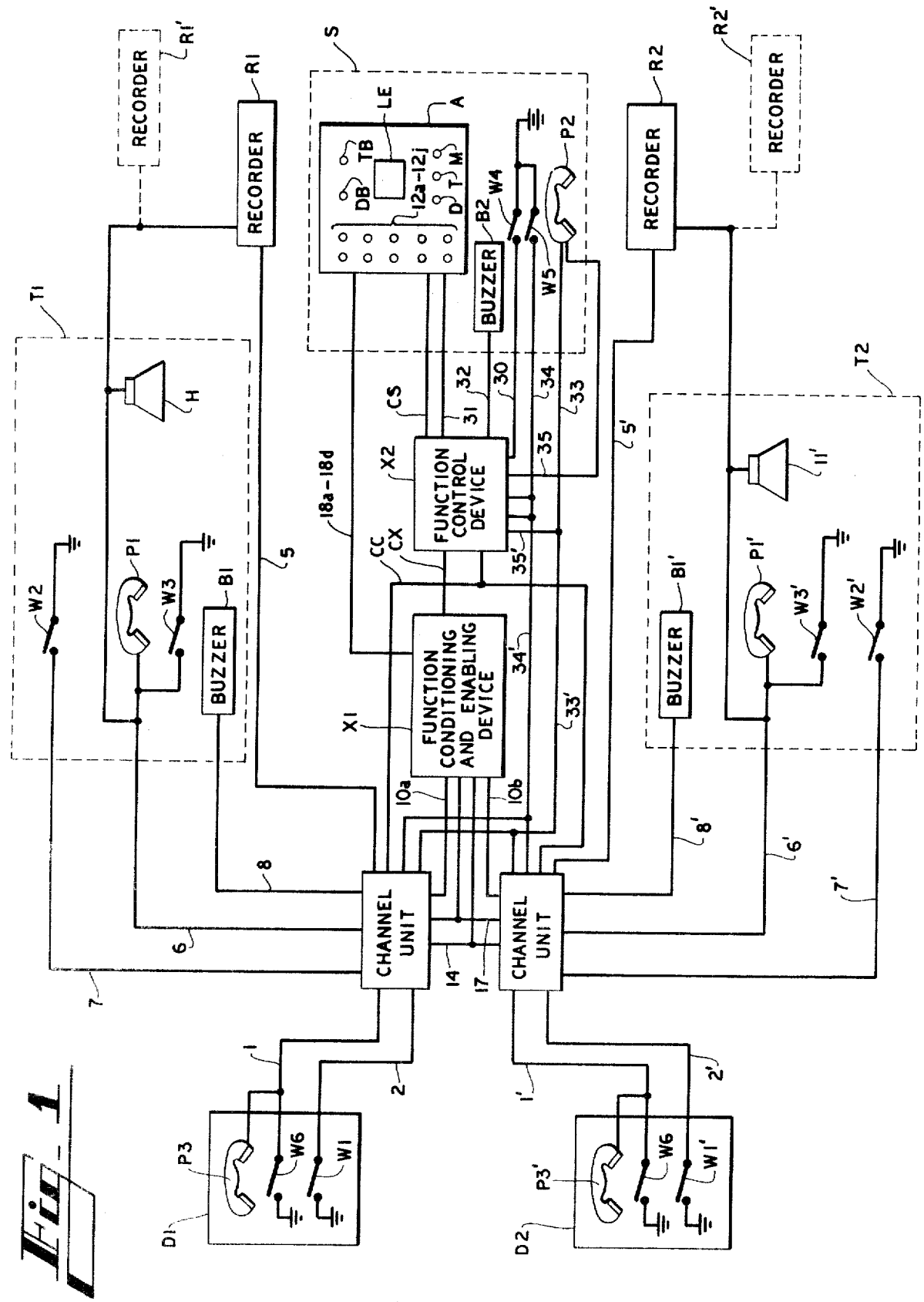
FIG. 1 is a schematic block diagram of an embodiment of the invention.

The invention disclosed herein is most easily understood from FIG. 1 which shows an embodiment of the invention that includes two recorders R1 and R2, two dictate stations D1 and D2, two transcriber stations T1 and T2, two channel units C1 and C2, a central control unit S, a function conditioning and enabling device X1, and a function control device X2. Even though not shown in FIG. 1, the embodiment of the invention disclosed herein may include a total of ten channel units such as the channel units C1 and C2 and as a result, this embodiment of the invention will provide communication and monitoring functions as described herein with respect to the central control unit S and up to a total of ten recorders R1 and R2, a total of ten transcriber stations T1 and T2, and a total of ten dictate stations D1 and D2.

Moreover, from the following description of an embodiment of the invention, it will be understood that other embodiments of the invention may include a greater total number of recorders R1 and R2, transcriber stations T1 and T2, and dictate stations D1 and D2 since the total number of recorders R1 and R2, transcriber stations T1 and T2, and dictate stations D1 and D2 which may be included in an embodiment of the invention is limited only by the number of channel units C1 and C2 as to which the recording system can provide channel reference signals as described below. Furthermore, it will be understood by those skilled in the art that the total number of dictate stations D1 and D2 which may be included in an embodiment of the invention can be increased beyond the total number of channel units C1 and C2 in an embodiment of the invention by including a conventional recorder selecting unit (not shown) between a plurality of dictate stations D1 and D2 and one or more of the channel units C1 and C2 so that the plurality of dictate stations D1 and D2 are operatively connected to a channel unit C1 or C2 by the recorder selecting unit on the basis of a criterion such as the availability of the recorder R1 or R2 associated with the channel unit C1 or C2.

In the embodiment of the invention shown in FIG. 1, the recorders R1 and R2 may be any conventional recorder responsive to audio and control signals provided by an audio and control circuit 5 or 5' from a channel unit C1 or C2. Thus, the recorders R1 and R2 are placed in a seized and standby mode of operation by an electrical seize condition such as that provided by a phone P3 or P3' at a dictate station D1 or D2 being removed from its cradle (not shown) to operate a hook switch W6 or W6' and are placed in various operating modes of operation such as the dictate mode of operation by electrical operating conditions provided by the operation of operating switches (not shown) at a dictate station D1 or D2.

Similarly, the dictate stations D1 and D2 differ from a conventional dictate station only in that they include an additional function selection switch W1 or W1'. Thus, the dictate stations D1 and D2 include a phone or microphone P3 or P3' operatively connected by an audio and control circuit 1 or 1' to a channel unit C1 or C2 and a switch which is conveniently a hook switch W6 or W6' operated by the removal of a phone P3 or P3' from a cradle (not shown). As indicated above, the operation of a hook switch W6 or W6' provides an electrical seize condition by an audio and control circuit 1 or 1' that causes a recorder R1 or R2 to be placed in a seized and standby mode of operation in which the recorder R1 or R2 is operative through the audio and control circuits 1 and 5 or 1' and 5' for the recording of dictation from a dictate station D1 or D2.

It will be understood from the description of the embodiment of the invention disclosed herein, that in the absence of a communication or monitoring function, a channel unit C1 or C2 will connect an audio and control circuit 1 or 1' of a dictate station D1 or D2 directly to an audio and control circuit 5 or 5' of a recorder R1 or R2. Thus, in the absence of a communication or monitoring function, the operation of a recorder R1 or R2 from a dictate station D1 or D2 through the audio and control circuits 1 and 5 or 1' and 5' may be in all respects conventional.

The function selecting switch W1 or W1' at a dictate station D1 and D2 is conveniently operated by a button on a phone P3 or P3' at the dictate station D1 or D2. However, regardless of the manner in which a function selecting switch W1 or W1' is operated, the operation of a function selecting switch W1 or W1' at a dictate station D1 or D2 provides a function signal to the channel unit C1 or C2 to which a dictate station D1 or D2 is operatively connected either directly or through a recorder selecting unit (not shown). Moreover, it will be understood that while the function selecting switches W1 and W1' are shown in FIG. 1 as providing function signals to the channel units C1 and C2 by function control circuits 2 and 2' which are separate from the audio and control circuits 1 and 1', the function control circuits 2 and 2' may be in the same cable as the audio and control circuits 1 or 1' so as to minimize the wiring between a dictate station D1 or D2 and a channel unit C1 or C2.

The transcribe stations T1 and T2 each include a conventional transcriber head set H or H' through which dictation being transcribed from a recorder R1 or R2 can be heard and the usual pedal or other controls (not shown) to operate a recorder R1 or R2 for the transcribing of dictation. In FIG. 1, a transcriber head set H or H' is shown by solid line to be connected by an audio and control circuit 17 or 17' to a recorder R1 or R2 with which a dictate station D1 or D2 is associated through a channel unit C1 or C2.

It will be understood that in this arrangement shown by solid line in FIG. 1, a recorder R1 or R2 will generally be of a type known in the art which permits the simultaneous recording and transcribing of dictation. However, it will also be understood that a transcriber head set H or H' and the usual pedal or other controls (not shown) at a transcriber station T1 or T2 can alternately be connected by an audio and control circuit 19 or 19' as shown by dashed line in FIG. 1 to recorders R1' and R2 which are separate from the recorders R1 and R2 on which dictation is being recorded from a dictate station D1 or D2.

In an arrangement of recorders R1, R1' R2, and R2' in which the transcriber stations T1 and T2 are operatively connected to the recorders R1' and R2' rather than to the recorders R1 and R2, the recorders R1, R1', R2 and R2' can conveniently be of a conventional type that uses a recording medium such as a tape cassette which can be manually transferred from a recorder R1 or R2 at which dictation was recorded to a recorder R1' or R2' for transcribing. However, it will now be understood that the invention is not limited to any particular arrangement or type of recorders R1, R1', R2 and R2'. Furthermore, it will be understood that the operation of a recorder R1, R1', R2, or R2' from a transcriber station T1 or T2 is in all respects conventional.

In addition to a conventional head set H or H' and pedal or other controls (not shown), each transcriber station T1 or T2 also includes a transcriber phone P1 or P1' operatively connect to a channel unit C1 or C2 by an audio and control circuit 6 or 6'. As shown in FIG. 1, the audio and control circuit 6 or 6' of a phone P1 or P1' is also operatively connected by a patch circuit 18 or 18' to the audio and control circuit 17, 17', 19 or 19' of a transcriber head set H or H'.

Each transcriber station T1 or T2 further includes a switch which is conveniently a hook switch W3 or W3' that is operated when a transcriber phone P1 or P1' is removed from a cradle (not shown) and which, when operated, provides an electrical condition on an audio and control circuit 6 or 6' connected to a channel unit C1 or C2 which indicates that a phone P1 or P2' has been removed from its cradle (not shown) for a communication function. However, regardless of whether a hook switch W3 or W3' is operated, an audio and control 6 or 6' is operatively connected by a patch circuit 18 or 18' to an audio and control circuit 17 or 17'.

In addition to the hook switches W3 and W3', each transcriber station T1 or T1' includes a function selecting switch W2 or W2' which is similar to a function switch W1 or W1' at a dictate station D1 or D2 in that when operated, a function selecting switch W2 or W2' provides a function signal to a channel unit C1 or C2 by a function control circuit 7 or 7'. The function selecting switches W2 and W2' may be operated by a pushbutton mounted on a transcriber phone P1 or P1' or by any other convenient arrangement.

Figure 2:
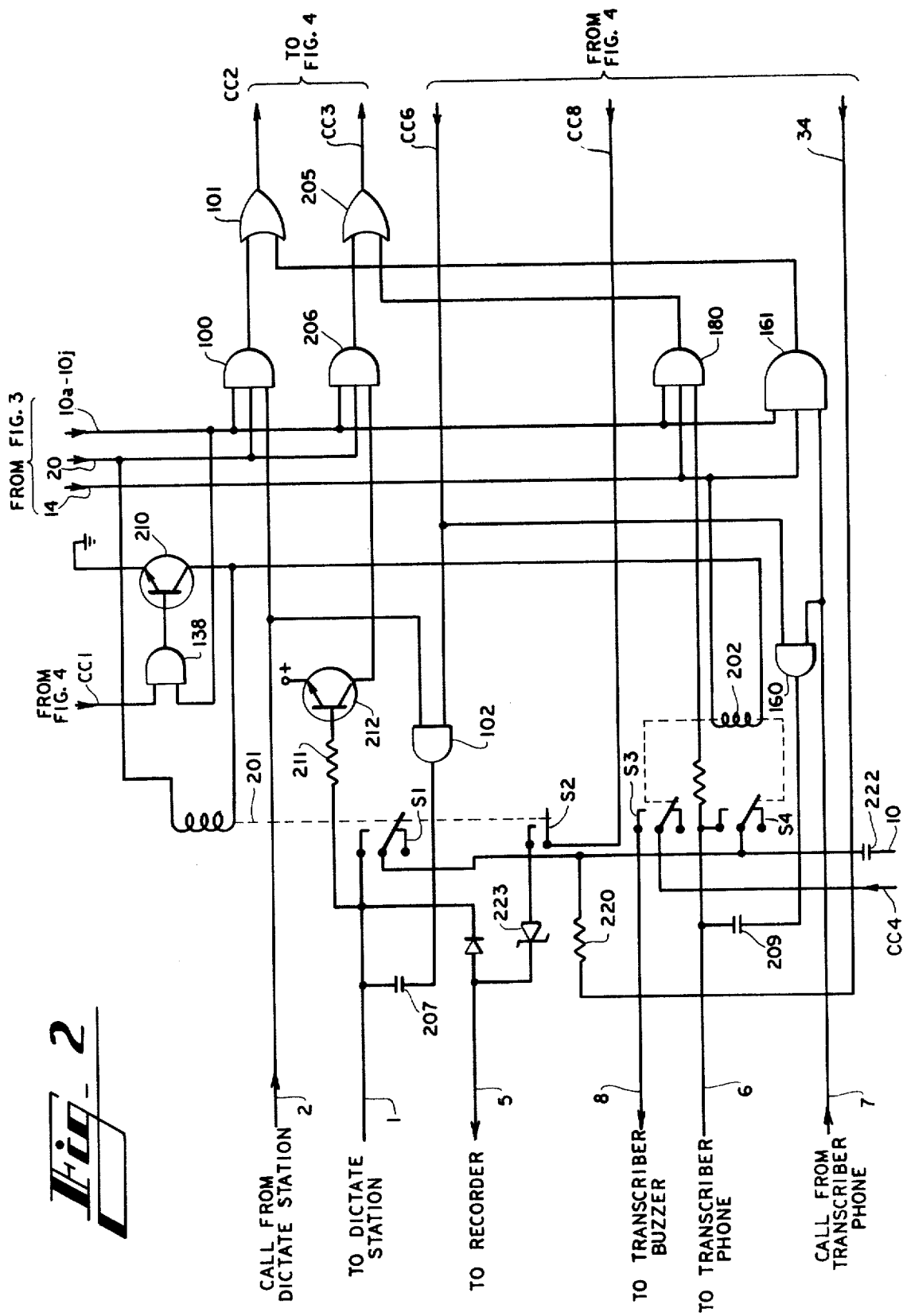
FIG. 2 is a circuit diagram of one of the channel units in the embodiment of the invention shown in FIG. 1.

A conventional electrically operated buzzer B1 or B1' is also provided at each transcriber station T1 or T2 and as indicated in FIG. 2, a buzzer B1 or B1' is responsive to an electrical signaling condition provided from a channel unit C1 or C2 by a signaling circuit 8 or 8'. Although the circuits 7 and 8 and the circuits 7' and 8' are shown separately from the audio and control circuits 6 and 6' respectively in FIG. 1, it will be understood that they may be in the same cable so as to minimize the wiring between a transcriber station T1 or T2 and a channel unit C1 or C2.

As seen in FIG. 1, the central control unit S includes a panel A in which are mounted ten buttons which are designated in FIG. 1 with the reference numbers 12a through 12j of the function selecting switches which they operate when depressed and which are shown in FIG. 5. The depressing of a button 12a-12j will operate a particular switch 12a-12j to provide a function signal to the function control device X2 by a function control connector 31.

Also mounted in the panel A are a button DB and a button TB which are also designated in FIG. 1 with the reference letters DB and TB of the function selecting switches DB and TB which they operate when depressed and which are shown in FIG. 5. As explained in detail below, the function selecting switches DB and TB when operated provide function signals to the function control device X2 by a connector within the cable CS.

In addition to the various buttons described above, the panel A also includes display lamps D, T, and M which are operated as described below by electrical signaling conditions provided from the function control device X2 by signaling connectors within the cable CS. Furthermore, the panel A includes a digital display device LED which in the embodiment of the invention disclosed herein is a conventional seven segment light emitting diode that is arranged to display digital numbers arbitrarily assigned to the channel units C1 and C1' in response to channel reference signals provided from the function conditioning and enabling device X1 by channel reference connectors 18a through 18d and an electrical signaling condition provided from the function control device X2 by a signaling connector within the cable CS.

In addition to the panel A as described above and the switches and circuitry associated with it as shown in more detail in FIG. 5, the central control unit S includes a phone P2 having an audio circuit 33 operatively connected to each of the channel units C1 and C2 and an audio circuit 35 operatively connected to each of the channel units C1 and C2 through the function control device X2, the connector 35' and the segment 33' of the audio circuit 33. It will be understood from the description of an embodiment of the invention below that the audio circuit 33 provides for communication from the channel units C1 and C2 to the phone P2 and that the audio circuit 35 selectively provides for communication to the channel units C1 and C2 from the phone P2.

The hook switch of the phone P2 is shown in FIG. 1 as the hook switch W4 and for convenience in describing the invention, the hook switch W4 is shown as being connected to the function control device X2 by a function control connector 30 which is separated from the audio and control circuit 33 of the phone P2. However, it will be understood that it is the placing of the phone P2 on-hook or off-hook in a cradle (not shown) which operates the hook switch W4 and that the solid line position of the hook switch W4 in FIG. 1 is the on-hook position.

In addition to the hook switch W4, the central control unit S also includes a communication enabling switch W5 which is conveniently a button operated switch mounted in the hand set of the phone P2. In any event, the operation of the communication enabling switch W5 will provide a talk signal to the function control device X2 and each of the channel units C1 and C2 by a control connector 34.

As also shown in FIG. 1, a buzzer B2 is located at the central control unit S and is responsive to an electrical signaling condition provided from the function control device X2 by the signaling circuit 32. While the connectors and circuits 30, 31, 32, 33, 34 and 35 are shown separately from the cable CS for the purpose of explaining the embodiment of the invention disclosed herein, it will be understood that they may be in the cable CS so as to minimize the wiring between the central control unit S and the function control unit X2.

As described in detail below, the function conditioning and enabling device X1 is constructed and arranged as shown in FIG. 3 to successively condition the channel units C1 and C2 for selection by a function selecting means of a communication and monitoring functions involving the dictate station D1 or D2, the transcriber station T1 or T2, and the recorder R1 or R2 associated with a particular channel unit C1 or C2. In addition, in the embodiment of the invention disclosed herein, the function conditioning and enabling device X1 is also constructed and arranged to enable the recording system to provide a communication or monitoring function selected by a function selecting means such as a function selecting switch W1 or W1'.

In the embodiment of the invention disclosed herein, the function conditioning device X1 serves as both a function conditioning means and a function enabling means because it has four modes of operation, two of which provide polling of the channel units and two of which enable the channel units to be latched by the function control device X2. In the first polling mode of operation of the function conditioning and enabling device X1, the function conditioning and enabling device X1 successively provides a channel reference signal to each of the channel units C1 and C2 by channel reference connectors 10a and 10b. The channel reference signal to the channel unit C2 by the channel reference connector 10b follows the channel reference signal to the channel unit C1 by the channel reference connector 10a, and it is because the embodiment of the invention disclosed herein will provide a channel reference signal in sequence to each of ten channel reference connectors such as 10a and 10b that the embodiment of the invention will accommodate a total of ten channel units.

In its first polling mode of operation, the channel unit also provides the ten channel reference signals to the central control unit S using the channel reference connectors 18a-18d as described below and at the central control unit S these channel reference signals provide a channel reference signal at one of the switches 12a-12j corresponding to a channel reference signal to a particular channel unit C1 or C2. Moreover, the channel reference signals as provided the central control unit S by the channel reference leads 18a-18d serve to provide a plurality of different electrical inputs to the digital display device LED with each electrical input corresponding to a channel reference signal to a particular channel unit C1 or C2.

Thus, there is a particular switch from among the switches 12a-12j at the central control unit S which corresponds to a particular channel unit C1 or C2 in that it receives one of the ten channel reference signals from the function conditioning and enabling device X1 simultaneously with the particular channel unit C1 or C2. Furthermore, there is a particular electrical input to the digital display device LED which corresponds to a particular channel unit C1 or C2 in that it occurs simultaneously with the channel reference signal to the particular channel unit C1 or C2.

In its first polling mode of operation, the function conditioning and enabling device X1 also provides a "D" function signal as a continuous signal to all of the channel units C1 and C2 by the function connector 20 and to the function control device X2 by the cable CX. It is this "D" function signal in combination with a channel reference signal at a particular channel unit C1 or C2 which conditions the recording system for selection of a communication or monitoring function with respect to the dictate station D1 or D2 or the recorder R1 or R2 associated with the particular channel unit C1 or C2.

In its second polling mode of operation, the function conditioning and enabling device X1 also successively provides channel reference signals to each of the channel units C1 and C2 by the channel reference connectors 10a and 10b as described above. Moreover, it also serves to provide these channel reference signals to the switches 12a-12j at the central control unit S as described above and to provide the plurality of electrical inputs to the digital display device LED as also described above. However, rather than provide a "D" function signal as described above with reference to the first polling mode of operation, the function conditioning and enabling device X1 in its second polling mode of operation provides an "T" function signal as a continuous signal to all of the channel units C1 and C2 by the function connector 14 and to the function control device X2 by the cable CX.

It is this "T" function signal in combination with a channel reference signal at a particular channel unit C1 or C2 which conditions the recording system for selection of a communication or monitoring function with respect to a transcriber station T1 or T2 associated with a particular channel unit C1 or C2. Moreover, in the absence of a communication or monitoring function, the function conditioning and enabling device X1 is alternately in its first polling mode of operation and its second polling mode of operation so it alternately conditions the recording system for selection of a "D" function involving each channel unit C1 and C2 and conditions the recording system for selection of a "T" function involving each channel unit C1 and C2.

Thus, once during each twenty successive channel reference signals, the recording system is conditioned for selection of a communication or monitoring function with respect to the dictate station D1 or D2 and the recorder R1 or R2 associated with a particular channel unit C1 or C2 and alternately, once during each twenty successive channel reference signals, the recording system is conditioned for selection of a communication or monitoring function with respect to the transcriber station T1 or T2 associated with a particular channel unit C1 or C2. Accordingly, it will now be understood that in the absence of a communication or monitoring function, the function conditioning and enabling device X1 serves as a conditioning means for conditioning the recording system continuously and selectively for selection of particular communication and monitoring functions involving the central control unit S and particular dictate stations D1 and D2, transcriber stations T1 and T2, and recorders R1 and R2.

The third and fourth enabling modes of operation of the function conditioning and enabling device X1 are modes of operation of the function conditioning and enabling device X1 which are alternatives to the first and second polling modes of operation described above and which serve to enable the recording system to provide a particular communication and monitoring function involving a particular channel unit C1 or C2 after the particular communication and monitoring function has been selected during the first or second polling mode of operation. Thus, the function conditioning and enabling device X1 provides its second polling and third enabling modes of operation in response to one of a plurality of function selecting means such as the switches W1, W1', W2, W2', and 12a–12j in order enable the recording system to provide a selected communication or monitoring function of the recording system.

In its third enabling mode of operation, the function conditioning and enabling device X1 continuously provides a channel reference signal by a channel reference connector 10a or 10b to a particular channel unit C1 or C2 and continuously provides the electrical input for the digital display device LED which corresponds to the particular channel unit C1 or C2. At the same time, it continuously provides a "D" function signal to all of the channel units C1 and C2 and to the function control device X2 by a connector within the cable CX. However, no channel reference signals are being provided to channel units C1 and C2 other than the particular channel unit C1 or C2 selected by the operation of a function selecting means.

Moreover, in this third enabling mode of operation of the function conditioning and enabling device X1, no "T" function signals are being provided by the function conditioning and enabling device X1 to any of the channel units C1 or C2. It will be understood from the description of an embodiment of the invention to follow that it is a continuous channel reference signal in combination with a continuous "D" function signal at only one particular channel unit C1 or C2 which enables the recording system to provide selected communication and monitoring functions with respect to a dictate station D1 or D2 or a recorder R1 or R2 associated with a particular channel unit C1 or C2.

In its fourth enabling mode of operation, the function conditioning and enabling device X1 continuously provides a channel reference signal by a channel reference connector 10a or 10b to a particular channel unit C1 or C2 and continuously provides the electrical input for the digital display device LED which corresponds to the particular channel unit C1 or C2. At the same time, it continuously provides a "T" function signal to all of the channel units C1 and C2 and to the function control device X2 by a connector within the cable CX. However, as in the third enabling mode of operation, no channel reference signals are being provided in the fourth enabling mode of operation to channel units C1 or C2 other than the particular channel unit C1 or C2 selected by operation of a function selecting means.

Moreover, in this fourth enabling mode of operation of the function conditioning and enabling device X1, no D function signals are being provided by the function conditioning and enabling device X1 to any of the channel units C1 and C2. It will be understood from the detailed description below that it is a continuous channel reference signal in combination with a continuous "T" function signal at only one particular channel unit C1 or C2 which enables the recording system to provide selected communication and monitoring functions with respect to a transcriber station T1 or T2 associated with a particular channel unit C1 or C2.

Moreover, it will now be understood that the function conditioning and enabling device X1 serves both as a polling or conditioning means to condition the recording system for the selection of a particular communication or monitoring function by operation of a function selecting means and as an enabling means for enabling the recording system to provide the particular communication or monitoring function selected by operation of a function selecting means. It will also be understood that while both of these means are provided by the function conditioning and enabling device X1 in the embodiment of the invention disclosed herein, a separate device could be used to provide each means.

The function control device X2 will be understood and the function conditioning and enabling device X1 will be further understood by assuming that it is desired to initiate a communication function from the dictate station D1. In this event, the function selecting switch W1 at the dictate station D1 is operated to provide a function signal at the channel unit C1 and when this function signal coincides at the channel unit C1 with a channel reference signal and a "D" function signal from the function conditioning and enabling device X1 in its first polling mode of operation, the channel unit C1 provides a select signal to the function control device X2 by a "set latch" connector within the cable CC. In the absence of any previously selected communication or monitoring function, this "set latch" signal causes a latching means including the latch 108 in the function control device X2 to latch the function conditioning and enabling device X1 in its third enabling mode of operation with a latching signal provided the function conditioning and enabling device X1 by the cable CX. The result is that the operation of the function selecting switch W1 has caused the function conditioning and enabling device X1 to change from its first polling mode of operation to its third enabling mode of operation in which a "D" function signal and a channel reference signal are continuously provided the channel unit C1.

Thus, it will be understood that the function selecting switch W1 and a latching means have served as a function selecting means to select a communication or monitoring function when the function conditioning and enabling device X1 is in its first polling mode of operation by changing the function conditioning and enabling device X1 to its third enabling mode of operation in which it enables the recording system to provide a communication function with respect to the dictate station D1. Moreover, it will also be understood that operation of the function selecting switch W1' at the dictate station D2 cannot now cause a function signal which will coincide with both a "D" function signal and a channel reference signal at the channel unit C2. Rather, if the function selecting switch W1' is operated when the function enabling means provided by the function conditioning and enabling means X1 is already operative, a busy signal means which includes the oscillators 116 and 119 in the function control device X2 will cause a busy signal to be provided the dictate station D2 from the channel unit C2.

At this point it should be noted that even in the absence of the function conditioning and enabling device X1 being operative as a function enabling means, the busy signal means will be operative to provide a busy signal to all dictate stations D1 and D2 and all transcriber stations T1 and T2 if the hook-switch W4 at the central control unit S is in its off-hook position. This is because the hook switch W4 in its off-hook position serves as a function disabling means for preventing a communication or monitoring function from being selected from a dictation station D1 or D2 or a transcriber station T1 or T2 and the busy signal serves to inform the dictate stations D1 and D2 and the transcriber stations T1 and T2 that the originating of a communication function is inappropriate for some reason such as a communication or monitoring function about to be originated at the central control unit S or the central control unit S being unattended.

In addition to providing a latching select signal to the function conditioning and enabling device X1, the function control device X2 includes a function signal control means which provides an electrical signaling condition by the signal circuit 32 to cause the buzzer B2 at the central control unit S to periodically buzz and which in response to the "D" function signal from the function conditioning and enabling device X1 provides an electrical signaling condition that causes the display lamp D to flash. Since the function conditioning and enabling device X1 is continuously providing a particular electrical input to the digital display device LED which corresponds to the particular function reference signal being continuously provided the channel unit C1, the signal means also provides by the cable CS the electrical signaling condition required for the digital display device LED to flash the digital number arbitrarily assigned to the channel unit C1.

Thus, the display lamp D, the digital display device LED, and the buzzer B2 serve as a signaling means for indicating at the central control units that a particular communication or monitoring function has been selected by a function selecting means associated with a particular channel C1 or C2. The indication provided by this signaling means continues until the phone P2 at the central control unit S is placed in its off-hook condition to provide a control signal on the function control connector 30 to the function control device X2 which terminates the operation of the buzzer B2 and causes the lamp D and the digital display device LED to burn continuously rather than flash. Thus, at this point, the hook switch W4 serves, with the function control device X2, as a signal altering means for changing the operation of the signaling means to indicate that a communication function has been initiated rather than just provided for by the function conditioning and enabling device X1.

In addition, the off-hook condition of the hook switch W4 causes the function control device X2 to provide a control condition to the channel unit C1 by the cable CC which results in the audio circuits 33 and 35 of the phone P2 being operatively connected to the audio and control circuit 1 of the dictate station D1. Furthermore, the off-hook condition of the hook switch W4 causes the function control device X2 to provide a control condition to the channel unit C1 by the cable CC which results in the recorder R1 being placed in its seized and standby mode of operation. Even though the recorder R1 will generally provide a "ready tone" in its seized and standby mode of operation, the connecting of the audio and control circuit 1 to the audio and control circuit 33 as described above is such that this "ready tone" is excluded from the audio and control circuit 1 when it is operatively connected to the audio circuits 33 and 35.

Thus, when a communication function is selected at a dictate station D1 or D2, the hook switch W4 and elements within the function control device X2 service not only to initiate a communication function between the audio and control circuit 1 and the audio circuits 33 and 35 but also as a recorder disabling means for disabling the recorder R1 while the communication function is in progress. It will be understood that such a recorder disabling means serves to ensure that the communication between the dictate station D1 and the central control unit S is not inadvertently recorded by the recorder R1 and is free from interference by a "ready tone" which would otherwise be provided the audio and control circuit 1 by the recorder R1.

The recording system will continue to provide for this communication until the phone P2 at the central control unit S is returned to its on-hook position to place the hook switch W4 in its on-hook position. When the hook switch W4 is returned to its on-hook position, the latching means within the function control device X2 releases the function conditioning and enabling device X1 from its third enabling mode of operation so that the function conditioning and enabling device X1 once again starts to condition the recording system for selection of communication or monitoring functions by alternately operating in its first polling mode of operation and its second polling mode of operation. In addition, the function control unit X2 causes the display lamp D and the digital display device LED at the central control unit S to be extinguished.

At this point, the hook switch W4 and elements within the function control device X2 such as the latch 108 serve as a reset means for resetting the recording system for the selection of a communication or monitoring function. However, it should be understood that had the communication function selected by the function selecting switch W1 and enabled by the function conditioning and enabling device X1 not been initiated by the operation of the hook switch W4, the reset function would be provided by the hook switch W6 being placed in its on-hook position upon dictation being completed from the dictate station D1.

The function control device X2 and the function conditioning and enabling device X1 will be even further understood by now assuming that it is desired to initiate a communication function from the transcriber station T1 by operating the function selecting switch W2. If the function selecting switch W2 is operated at the transcriber station T1 to provide a function signal to the channel unit C1 which coincides with a "T" function signal and a channel reference signal from the function conditioning and enabling device X1 operating in its second polling mode of operation, the channel unit C1 will provide a select signal to the function control device X2. In the absence of any previously selected communication or monitoring function and in response to this select signal, the latching means in the function control device X2 will provide a latching signal to the function conditioning and enabling device X1. However, in connection with this communication function, the latching signal causes the function conditioning and enabling device X1 to change from its second polling mode of operation to its fourth enabling mode of operation in which it is latched so that it continuously provides a "T" function signal and a channel select signal to the channel unit C1.

As with the operation of a function selecting switch W1 or W1' at a dictate station D1 or D2, the operation of the function selecting switch W2 at the transcriber station T1 will also result in the buzzer B2 intermittently buzzing and in the digital display device LED flashing with the digital number arbitrarily assigned to the channel unit C1. However, in response to a "T" function signal from the function conditioning and enabling device X1, the display lamp T rather than the display lamp D will flash at the central control unit S when the function selecting switch W2 is operated. Nevertheless, as with the operation of a function selecting switch W1 or W1' at dictate station D1 or D2, the operation of the function selecting switch W2 at the transcriber station T1 will cause the signaling means provided by the recording system to continue operating in this manner until the hook switch W4 is placed in its off-hook position by the removal of the phone P2 from the its hook at the central control unit S.

The placing of the hook switch W4 in its off-hook position not only initiates the communication function selected, terminates the buzzer B2, and causes the display lamp T and the digital display device LED to be illuminated continuously, it also causes the function control device X2 to provide a control condition to the channel unit C1 which results in the audio circuits 33 and 35 of the phone P2 at the central control unit S being operatively connected to the audio and control circuit 6 of the transcriber phone P1. However, in connection with a function selected by a function selecting switch W2 or W2', the function control device X2 does not cause any recorder R1, R1', R2, or R2' to be disabled for dictation or transcription.

Thus, at this point it will be understood that a communication function resulting from the operation of the function selecting switch W2 at the transcriber station T1 has in no respect interfered with the recording of dictation on the recorder R1 from the dictate station D1. Moreover, it will be understood that this communication function will not interfere with the transcribing of dictation from a recorder R1 OR R1' at the transcriber station T1 except to the extent that it diverts the attention of the individual at the transcriber station T1 from transcribing.

Moreover, it is only in the event that the audio and control circuit 6 of the transcriber phone P1 is connected by the patch circuit 18 to the audio and control circuit 17 of the transcriber head set H that the dictation being transcribed from the recorder R1 at the transcriber station T1 can be heard at the central control unit S. However, it will be understood that if the audio and control circuit 6 of the transcriber phone P1 is connected to the audio and control circuit 17, the communication function of the recording system being described will enable an individual at the transcriber station T1 and an individual at the central control unit S simultaneously to hear the dictation being transcribed from the recorder R1 and to consult with each other concerning its interpretation.

As with a communication function selected by the operation of the function selecting switch W1 at the dictate station D1, the communication function selected by the operation of the function selecting switch W2 is terminated upon the hook switch W4 at the central control unit S being returned to its on-hook position and if the communication function selected and enabled was not actually initiated by the hook switch W4 being placed in its off-hook position, the communication is terminated by the hook switch W3 being placed in its on-hook position. Regardless of the manner in which the communication function is terminated, the reset means in the recording system causes the lamp T and the digital display LED to be extinguished. In addition, the reset means causes the latch 108 in the function control device X2 to release the function conditioning and enabling device X1 from its fourth enabling mode of operation so that it returns to being alternately in its first polling mode of operation and its second polling mode of operation and causes the audio circuits 33 and 35 of the central control unit S to be disconnected from the audio and control circuit 6 of the transcriber phone P1.

The central control unit S also includes function selecting means which in cooperation with the function conditioning and enabling device X1 serve to select any one of several communication and monitoring functions of the recording system. For example, when it is desired to communicate with a transcriber station T1 or T2 from the central control unit S, the function selecting switch TB and a function selecting switch 12a–12j are operated in sequence. The operation of the function selecting switch TB provides a function signal by a connector within the cable CS to the function control device X2 which causes a T function latch 131 within the function control unit X2 to provide a latch signal by a function connector within the cable CX to the function conditioning and enabling device X1 that latches the function conditioning and enabling device X1 in its second polling mode of operation.

Assuming that a communication function is desired with the transcriber station T1, the function switch 12a which is operated is the function switch 12a-12j to which the function conditioning and enabling device X1 provides the same channel reference signal as that provided to the channel unit C1. Thus, the operation of the appropriate function selecting switch 12a-12j provides a function signal from the central control unit S at that moment at which the recording system is conditioned for a communication or monitoring function with respect to the transcriber station T1 associated with the channel unit C1.

This function signal resulting from the operation of a function selecting switch 12a-12j causes the latch 108 in the function control device X2 to latch the function conditioning and enabling device X1 in its fourth enabling mode of operation in which a "T" function signal and a channel reference signal are continuously provided the channel unit C1. In addition, since the hook switch W4 at the central control unit S is off hook, the function control device X2 provides a control condition to the channel unit C1 by the cable CC which results in the audio circuits 33 and 35 of the phone P2 being operatively connected to the audio and control circuit 6 of the phone P1 at the transcriber station T1. Moreover, the function signal control means provides electrical signaling conditions that cause the buzzer B1 to intermittently buzz at the transcriber station T1, the display lamp T to be lit at the central control unit S, and the digital display device LED to display the digital number arbitrarily assigned to the channel unit C1.

The buzzer B1 will continue to intermittently buzz until the hook switch W3 at the transcriber station T1 is placed in its off-hook position by the phone P1 being taken off-hook. It will be understood that at this point the phone P2 at the central control unit S is connected by its audio circuits 33 and 35 to the audio and control circuit 6 of the transcriber phone P1 since the function control device X1 has provided the required control condition to the channel unit C1. Thus a communication function may occur in the same manner as with a communication function originated by the operation of the function selecting switch W2.

In the event that it is desired to monitor the transcribing of dictation at the transcriber station T1 from the central control unit S through the audio and control circuit 6 and the patch circuit 18 rather than originate a communication function between the central control unit S and the transcriber station T1, the appropriate function selecting switch 12a-12j is closed without the prior closing of the function selecting switch TB. As will be more fully described, this causes the recording system to establish a monitoring function in the same manner as it established the previously described communication function between the central control unit S and the transcriber station T with the exception that the buzzer B1 does not intermittently buzz. Thus, it will be understood that in this monitoring function, the central control unit S will be monitoring the transcribing of dictation at the transcriber station T1 from the recorder R1 without the individual at the transcriber station T1 being aware of the monitoring.

When it is desired to initiate a communication or monitoring function between the central control unit S and a dictate station D1 or D2, the hook switch W4, the switch DB, and the appropriate switch 12a-12j become the function selecting means for selecting from the central control unit S a particular communication or monitoring function with respect to a dictate station D1 or D2 associated with a particular channel unit C1 or C2 when the channel unit C1 or C2 is conditioned for the communication or monitoring function by the function conditioning and enabling device X1.

Assuming that an individual at the central control unit S desires to communicate with the dictate station D1 because of a condition observed with respect to the recorder R1 or for some other reason, the phone P2 at the central control unit S is removed from its cradle to provide the off-hook condition of the hook switch W4 which provides a control signal to the function control device X2 by the connector 30. Next the function selecting switch DB is operated to provide a function signal by a function connector in the cable CS to the function control device X2 which causes the "D" function latch 132 to serve as a latching means that latches the function conditioning and enabling device X1 in its first polling mode of operation. Finally, the appropriate function selecting switch 12a-12j is operated to provide a function signal to the latch 108 in the function control device X2 simultaneously with a channel reference signal being provided to the channel unit C1 from the function conditioning and enabling device X1.

The result of the function signal to the latch 108 is that the latch 108 serves as a latching means for latching the function conditioning and enabling device X1 in its third enabling mode of operation so that it continuously provides a "D" function signal and a channel reference signal to the channel unit C1. However, whether the recording system is enabled for a communication or monitoring function at this time depends upon whether the dictate station D1 is in use for the recording of dictation on the recorder R1. If the recorder R1 is in use, the function control device X2 will cause display lamp M to be lit and the digital display device LED to be illuminated with the digital number arbitrarily assigned to the channel unit C1.

Furthermore, the central control unit X2 will, through the cable CS, cause only the audio circuit 33 from the phone P2 at the central control unit S to be operatively connected into the audio and control circuits 1 and 5 between the dictate station D1 and the recorder R1. However, although at this point the recording of dictation from the dictate station D1 on the recorder R1 will be monitored through the phone P2 at the central control unit S, communication originating at the phone P2 is inhibited. Therefore, dictation from the dictation station D1 will continue without any interference with the recording function and without the individual at the dictate station D1 being aware that the recording of dictation is being monitored.

Thus, the recording system disclosed herein permits an individual at the central control unit S to select the most appropriate time during the course of dictation from a dictate station D1 or D2 at which to interrupt dictation being recorded on a recorder R1 or R2 and communicate with the individual using the dictate station D1 or D2. However, at such an appropriate time, the operation of the talk switch W5 at the central control unit S will provide a control signal to the channel unit C1 and to the function control device X2 by the connector 34. At the function control device X2, this control signal results in the recorder R1 being placed in its seized and standby mode of operation and in the audio circuit 35 also being operatively connected to the audio and control circuit 1 so as to enable two-way communication between the phone P2 and the dictate station D1 through the audio and control circuit 1 of the dictate station D1 in such a manner that the "ready tone" from the recorder R1 is excluded from the audio and control circuits 1, 33, and 35.

Thus, the talk switch W5 serves as an element in a communication enabling means which enables communication from the central control unit S only when the communication is appropriate and can not be recorded by the recorder R1.

If the recorder R1 had not been in use when the function conditioning and enabling device X1 was changed from its first polling mode of operation to its third enabling mode of operation by the operation of the function selecting switch DB and the appropriate function selecting switch 12a–12j as described above, the function control device X2 would have caused the display lamp D rather than the display lamp M to be initially lit. Moreover, the recorder R1 would have been immediately placed in its seized and standby mode of operation and operation of the talk switch W5 would have enabled communication between the phone P2 and the recorder R1 for recording on the recorder R1 from the phone P2.

It will be understood that this communication function of the recording system disclosed herein permits an individual at the central control unit S to record instructions or other information on a recorder R1 to be used in the transcribing of dictation at a transcriber station such as a transcriber station T1 or T2. It will also be understood that even though an individual at the central control unit S intends to select this communication function, the recording system disclosed herein includes a function altering means which causes the function enabled by the recording system to be the monitoring function described above rather than the communication function selected when the recorder R1 or R2 involved in the communication function selected is already in use from a dictate station D1 or D2. The manner in which this function altering means is provided by the flip-flop 130 in the embodiment of the invention disclosed herein, the manner in which the various communication and monitoring functions described above and others are provided by the embodiment of the invention disclosed herein, and the manner in which the various means described above and others are provided by the embodiment of the invention disclosed herein will all be more clearly understood from the following description of the operation of this specific embodiment of the invention as shown in detail in FIGS. 2, 3, 4, and 5.

OPERATION

Central to the understanding of the operation of the preferred embodiment of the invention, is an understanding of the operation of the function conditioning and enabling device X1. As described more fully below, the function conditioning and enabling device sequentially polls both the individual dictate stations and transcriber stations electrically connected to the dictation recorders as well as the channel selector switches of the central control unit S which correspond to the recorders to which the presently polled dictate stations and transcriber stations are connected. Thus, the function control and enabling device permits an enabling input from the various dictate stations and transcriber stations and from the various central control unit channel selector switches periodically. Moreover, the time of input from the dictate stations or the transcriber stations corresponds with the time the channel and mode from which the input originated is the channel and mode to which the central control unit S is presently responsive. Similarly, the time of input from the channel selector switches and mode control switches of the central control unit S corresponds to the time the channel and mode selected by the operation of the channel selector switches and mode switches is the channel and mode which is presently electrically connected with the function control and enabling device. It is this completion of the electrical connection between the conditioning and enabling device and the respective dictate stations, transcribe stations and central control unit channel selector switches which is hereinafter referred to as polling or conditioning the dictate station, transcriber station, or central control unit channel selector switch. As will be further described, it is only when the dictate station, transcriber station or central control unit channel selector switch has been polled or conditioned that audio communication or signaling between the dictate station or transcriber station and the central control unit and audio communication and signaling between the central control unit and selected dictate stations or transcriber stations will be enabled.

The function conditioning and enabling device X1 is shown in FIG. 3. The function control and enabling device comprises a clock oscillator 300, and AND gate 301, a binary coded decimal counter (BCD) 305, a toggled flip-flop logic device 303, and a BCD to decimal decoder 304.

The clock oscillator 300 regulates the frequency at which the polling operation proceeds. However, the polling operation only proceeds in the absence of communication and signaling between the central control unit and a dictate station or transcriber station having been enabled. As will be more fully described below, the aforesaid absence of communication and signaling is indicated by the presence of a voltage condition on line CX1 corresponding to a logic ONE. The logic ONE on line CX1 and the periodic inputs from the clock oscillator 300 are inputs to AND gate 301. AND gate 301 provides a ONE input to the BCD 305 each time the combination of a ONE on line CX1 and a periodic signal from the clock oscillator 300 is present. Each input to BCD 305 causes the count to change by one binary number.

As will be understood by those skilled in the art, a BCD is a device which "counts" by providing a distinct combination of outputs for each number to which the BCD has "counted". The "counting" is caused each time an input signal is received by the BCD. As will also be understood by those skilled in the art, the number of distinct combinations provided by a BCD is limited; therefore, the combinations of outputs, while remaining distinct from their immediate predecessors, will begin to repeat after the BCD has "counted" to its limit. The sequence or order of the distinct outputs remains the same in each cycle.

As set forth above, periodic inputs are provided by AND gate 301 to BCD 305 thereby causing the BCD 305 to change to a distinctly new combination of outputs periodically. Each distinct combination of outputs is predictably provided once each cycle and therefore at intervals of time dictated by the period required for the BCD 305 to complete a cycle at the counting frequency of the clock oscillator 300.

The conditioning of the channels 10a-10j, the conditioning of the central control unit channel selector switches 12a-12j, the indication provided by the central control unit LED channel display 503 and the state of the toggled mode selection flip-flop 303 are all caused, directly or indirectly, by the combination of outputs provided by the BCD 305. The polling or conditioning of the channels to which the dictate stations and transcriber stations are connected is caused by passing the combination of four digital outputs of the BCD through a BCD to decimal decoder 304 in order to provide a distinct one of ten available outputs of the decoder 304 for each of one of the ten combinations of digital outputs provided by the BCD 305. As will be further described, each of these distinct decoder outputs 10a-10j conditions a separate channel unit such as C1 or C2 in FIG. 1. For example, an output at decoder 304 output 10a causes an electrical state on line 10a from the function conditioning and enabling device X1 to the channel unit C1. Thus, when the function conditioning and enabling device is polling, the channel units are conditioned sequentially, such that each channel unit is conditioned periodically at intervals fixed by the period of the cycle of the BCD 305. Unless overridden by the operation of the mode control buttons DB or TB as will be more fully described along with the initiation of communication by the supervisor at the central control unit S, the toggled mode selection state of the flip-flop 303, which dictates the mode polled at each channel unit as it is conditioned, is also responsive to the output of the BCD 305.

As will be more fully described in subsequent sections, the polling operation requires that the toggled mode selection flip-flop 303 provide a signal to the channel units such that when each channel unit is conditioned, it will also be polled or conditioned for communication or signaling to or from the dictate stations, such as D1 or D2, or be polled or conditioned for communication or signaling to or from the transcriber stations, such as T1 or T2. This supplementary conditioning or polling of the dictate station or transcriber station connected to the polled or conditioned channel unit is determined by output of the toggled mode selection flip-flop 303. Two successive outputs of the BCD 305 which are either at the beginning or at the end of the channel conditioning cycle of the BCD 305 are electrically connected in toggled configuration to provide set and reset inputs to the toggled mode selection flip-flop 303 by line 306. Thus, the BCD 305 causes the toggled mode selection flip-flop 303 to provide a Q output or a −Q output for the duration of alternating polling cycles of the BCD 305. As will be more fully described, during the cycle the Q output is present, the Q output causes polling of the transcriber stations elecrically connected to each of the channels polled. Conversely, during the cycle the −Q output is present, the −Q output causes polling of the dictate stations electrically connected to each of the channels polled. Thus, the BCD 305 not only causes the channels to be periodically and sequentially polled, but also causes the dictate stations and transcriber stations to be periodically and sequentially polled since the BCD 305 causes the dictate stations connected to each channel to be polled on one cycle of the BCD and the transcriber stations connected to each channel to be polled in the next cycle of the BCD.

The BCD 305 also causes the sequential and periodic conditioning or polling of the central control unit channel selector switches 12a-12j. In the same sequence as the channels are conditioned by the outputs 10a-10j, the central control unit channel selector switches 12a-12a are also conditioned or polled. The outputs of the BCD 305 are transmitted from the function conditioning and enabling device X1 to the central control unit S, shown in FIG. 5A, as digital signals along lines 18a-18d. The digital signal output of the BCD 305 is provided to a BCD to decimal decoder 501 in order to provide a distinct one of ten available outputs of the decoder 501 for each of one of ten of the combinations of digital signals provided by the BCD 305. Each of these ten outputs, 505a-505j is passed through one of the diodes 504a-504j, respectively, to provide a signal to central control unit channel selector switches 12a-12j, respectively. As will be more fully described, the coincidence of the closing of one of the central control unit channel selector switches 12a-12j by the supervisor along with the conditioning or polling of that channel, thereby causing a signal to be provided central control unit at the channel selector switch 12a-12j corresponding to the conditioned or polled channel, closes a circuit to the function control device X2 which enables communication and signaling from the supervisor at the central control unit S with, depending on the supervisor's mode selection, either the dictate station or transcriber station connected to the polled or conditioned channel. Thus, the BCD 305 also causes the function conditioning and enabling device to be periodically and sequentially responsive to operation of a particular channel selection selector switch 12a-12j by the supervisor at the central control unit S.

As will be more fully described, the central control station S is provided with a seven-element LED 503 responsive to the output of BCD 305 and the function control device X2 for visually indicating the channel in functional communication with the central control unit 5. The BCD provides digital signals through lines 18a-18d to BCD to 7 segment decoder 502. The combination of digital signals from the BDC 305 informs the BCD to 7 segment decoder 502 to provide an output to the 7 segment LED display 503 such that the LED display 503 forms the decimal number of the channel which the BCD 305 has conditioned or polled and which, as will be described below, has been latched by the function control device X2.

It will now be understood by those skilled in the art that the function conditioning and enabling device provides a means for periodically and sequentially placing each of a plurality of channels in a condition enabling each dictate station and transcriber station electrically connected to each of said channels to signal and communicate with a central control unit. It will also be understood that the function conditioning and enabling device also provides a means for periodically and sequentially enabling a supervisor at a central control unit to signal and communicate with a dictate station or transcriber station electrically connected to a selected channel. It will be further understood that the function conditioning and enabling device provides a means for informing the central control unit of the channel with which it is functionally connected.

Those skilled in the art will appreciate that the combination of the clock oscillator 300 and BCD 305 might be replaced by equivalent means for providing periodic and sequential distinct outputs for conditioning the channel units and the central control unit. For example, rotary switches would perform such a function. It is to be understood that the present embodiment is not limited to the clock oscillator 300 and BCD 305 combination, but encompasses the full range of functional equivalents as set forth in the claims.

Conditioning and Enabling Communication Between the Central Control Unit and a Dictate Station D1 or D2 by Operation of the Dictate Station D1 or D2

The originating of a communication between a dictate station D1 or D2 and the central control unit S by a dictate station D1 or D2 is through the channel unit C1 or C2 which connects the dictate station D1 or D2 by a lead 10 to a particular recorder R1 or R2. It will be understood that the communication function of the invention disclosed herein enables the user of a dictate station D1 or D2 to communicate with the central control unit S with respect to dictation to be recorded, dictation being recorded, or dictation which has been recorded on a particular recorder R1 or R2.

For the purpose of describing this communication function of the invention disclosed herein, it will be assumed that the communication is originated by dictate station D which is connected through the channel unit C1 to the recorder R1. However, it will be understood that this communication function will also be provided in the same manner by the invention disclosed herein if the dictate station D1 were connected by a recorder selector unit to the channel unit C2 or to any one of eight additional channel units such as the channel units C1 and C2 or if the dictation station D2 or any other dictate station were connected through a recorder selector unit and the channel unit C1 to the recorder R1.

It will be understood from the description of the invention herein that while this communication function is being provided between the dictate station D1 and central control unit S, the dictate station D and as many as eight additional dictation stations may be used to record dictation on other recorders, such as R2. Moreover, it will also be understood that the transcribing of dictation may continue at the transcriber station T1 connected to the channel unit C1 and at other transcriber stations such as transcriber station T2 connected to other channel units such as channel unit C2.

When this communication function is originated at the dictate station D1, it is originated by the operation of a switch W1 at the dictate station D1 which is connected by lead 2 to the channel unit C1. Thus, when the switch W1 is closed at the dictate station D1, a voltage is passed to channel unit C1, the same channel unit to which the audio and control circuit 1 of the dictate station D is connected.

The manner in which this signal provided by the switch W1 provides the communication function being considered is best understood by also considering the polling or conditioning operation of the function conditioning and enabling device X1, as described above. The signal provided on line 2 by the closing of switch W1 at the dictate station provides an input to AND gate 100 in the channel unit. When the channel unit and its dictate station are polled, the other inputs to AND gate 100, a signal on line 10a from BCD to decimal decoder 304 and a signal on line 20 from the −Q output of toggled mode selection flip-flop 303, are also provided. The operation of AND gate 100 provides an output through OR gate 101 to AND gate 104 in the function control device X2, shown in FIG. 4. If the phone at the central control unit S is on-hook indicating that no other communication or monitoring is in progress or being attempted, no voltage will appear on line 30. The absence of voltage on line 30 will cause inverter 105 to provide the other input to AND gate 104 providing an output from AND gate 104 through OR gate 106 to the set input of latch 108. The set input to latch 108 causes the output of latch 108 to change from −Q to Q thereby stopping the polling operation of the function conditioning and enabling device.

As described above in the description of the Operation of the Function Conditioning and Enabling Device, the removal of the voltage from the −Q output of the latching circuit 108 removes the input by the lead CX1 to the AND gate 301 and causes the BCD 305 to stop counting. As a result, when a channel unit is latched by the function control device X2, the output of the BCD 305, the one of ten decoder 304 and the toggled mode selection flip-flop circuit 303 remain fixed in that unique condition which corresponds to the provision of conditions at the AND gate 100 of channel unit C required for the signal from the W2 to pass through the AND gate 100 to the OR gate 101. The condition of the function conditioning and enabling device described above also provides the basis for identifying the particular channel unit which has caused the latching circuit L1 to be set as explained below.

As will be more fully explained hereafter, the setting of latch 108 by a call from a dictate station closes a switch actuated by relay 506 on line 35 in order to enable an audio path from the central control unit S to the system components electrically connected to the channel station to be subsequently completed. As will also be understood by the further descriptions of the operation of the invention, communications between the central control unit and the dictate stations D1 or D2, transcribe stations T1 or T2, and recorders R1 and R2 may be accomplished through a common audio path between the central control unit S and the system components attached to the channel station. Moreover, this communication may be initiated by the supervisor at the central control unit S. Inasmuch as it is desirable to allow the supervisor to inadvertently interrupt dictation, a dictation monitor condition is provided whereby the supervisor will receive audio signals from the dictate station, but will not be enabled to interrupt the dictation without consciously operating a PTT switch W5 in addition to merely achieving functional connection with the dictate station. The on and off switching of the common audio path from the central control unit S and to the channel unit is achieved by providing an audio path for those signals from the central control unit S which is distinct from the audio path to the central control unit S for a portion of its length. The distinct length of audio line from the central control station S originates, as is shown in FIG. 5B, from the phone P2 and continues through a relay switch 506 in the function control device X2, shown in FIG. 4, until it joins the audio line 33 to form audio line 33'. It is the function of the relay switch 506 to inhibit audio signals from the central control station S which might inadvertently interrupt dictation.

As set forth above, the setting of the latch 108 in response to a call from a dictate station causes relay switch 506 to close and enable subsequent completion of the audio path from the central control unit S to the channel unit and dictate station. The Q output from latch 108 combines at AND gate 411 with a −Q input from "D" latch 132, indicating that the call was not initiated by the central control unit S, as will be more fully explained hereafter; and a −Q output from the toggled mode selector latch 303, indicating that a dictate station has been conditioned or polled and latched by function control device X2. The output from ANd gate 411 passes through OR gate 507 to close relay switch 506 and enable subsequent completion of the audio path on line 35 from the central control unit S to the channel unit.

In addition to stopping the further polling or conditioning of other channel units, the setting of the latch 108 and provision of a Q output also provides a busy signal to those dictate stations which will now not be periodically polled or conditioned again until the latch 108 is reset and therefore will be unable to be functionally connected to the central control unit S.

Referring now to FIG. 2, the busy signal is provided the other dictate stations from the channel unit to which they are electrically connected, such as C2, through line 1 and to the calling dictator through the hand set P3'. The channel unit C2 provides the busy signal to the dictate station D2 in response to a voltage on capacitor 207 from AND gate 102. The inputs to AND gate 102 are provided: (1) by the dictator's operation of the switch W1' of the dictate station to create a voltage on line 2' in order to attempt to call the central control unit S and (2) by a voltage provided along CC6 from AND gate 118 in the function control device X2, shown in FIG. 4. AND gate 118 is responsive to the outputs of both a slow oscillator 116 and a fast oscillator 119, both of which function constantly; the Q output provided by the now set latch 108; and a voltage from inverter 120, which provides a voltage only when a caller is unsuccessful in placing a voltage on line CC2, otherwise inverter 120 does not provide a voltage, but inhibits a busy signal to a caller when the central control unit is not busy, i.e., when the caller has met the conditions at AND gate 100 and completed the circuit CC2 between the channel unit C1 and function control device X2.

The voltage output at Q resulting from the latching circuit 108 being set provides an input to AND gate 110 and to AND gate 135. The other input to the AND gate 110 is from slow oscillator 116 through an OR gate 111. The other input through the OR gate 111 is from the hook switch W4 of the central control unit phone P2 at the central control unit S and as long as the phone P2 is on-hook, the OR gate 111 enables the AND gate 110 only in response to pulses from the slow oscillator 116. Thus, the output from the AND gate 110 is a pulsing voltage which is provided by CS6 to the central control unit S AS a pulsing base voltage for the transistor 115. This pulsating voltage at the base of the transistor 115 provides for two functions.

The first function of the pulsating base voltage at transistor 115 is to provide a pulsating ground through the transistor 116 for three lights D, T and M as shown in FIG. 5. The second function is to provide a pulsating ground for a conventional LED numerical display unit L5 as also shown in FIG. 5A.

The voltage inputs to the lights D, T and M are provided by the leads CS4, CS3 and CS5 from the function control device X2. As seen from FIG. 4, a voltage is only provided on the lead CS3 by a voltage from the AND gate 409 which is responsive to the Q output of the toggled mode selection flip-flop circuit 303. However, as explained above, there is no Q output from the toggled mode selection flip-flop 303 in connection with the particular function being presently described, viz., conditioning or polling of a dictate station.

Similarly, as will be explained hereinafter, there is no output on the lead CS5 in connection with the particular function being presently described. Rather, the output is on the lead CS4 provided by the AND gate 113 which is responsive to the −Q output of the toggled mode selection flip-flop circuit 303, indicating and providing for polling a conditioning of a dictate station at each channel polled a conditioned, as described in operation of the Function Conditioning and Enabling Device. The other input to the AND gate 133 is provided through an inverter 408 indicating the absence of an output on the lead CS5.

Thus, the pulsing ground provided by the transistor 116 causes the light D to pulse, but does not cause lights T and M to pulse. As will be explained hereinafter, the pulsing of this particular light serves to indicate at the central control unit S that the function being originated is a communication from a dictate station rather than another function.

The input to the ground of transistor 115 also causes the LED 503 to provide a pulsing display. The other input to the LED 503 is through a seven segment decoder 502 as described above in operation of the Function Conditioning and Enabling Device. It will be understood by reference to that section that the pulsing display provides the supervisor at the central control unit S with the number of the channel from which the call originated.

Additionally, as set forth above, the setting of the latching circuit 108 has provided an input voltage to an AND gate 135. The other inputs to this AND gate 135 are through the inverter 105 from the hook switch W4 of the phone P2 at the central control unit S and from the slow oscillator 116. While the phone at the central control unit S is on-hook so that voltage is provided from the inverter 105 to the AND gate 135 and while the latching circuit 108 is latched, the input from the slow oscillator 116 to the AND gate 135 will cause the AND gate 135 to provide a pulsing output. This pulsing output from the AND gate 135 is provided from the function control device X2 along line 32 to the central control unit S to cause a buzzer B1 to intermittently buzz.

It will now be understood that the latching of the latching circuit 108 by the closing of the switch W1 at a dictate station D1 has caused the particular light D to pulse, the buzzer B1 to intermittently buzz, and the LED to flashingly display a particular number corresponding to the number channel unit C1 from which the call originated. Moreover, it will be understood that this operation of the light D, the buzzer B1 and the LED unit will continue until the hand set P2 at the supervisor station is taken off-hook W-4 to provide a voltage on the lead 30, even though the switch W1 is released at the dictate station D and the recording of information such as dictation with the recorder L1 is continued. However, once a voltage is placed on line 30 by the action of the supervisor in taking the phone P2 at the central control unit off-hook and closing hook switch W4, the buzzer B1 will cease to buzz and the D light and LED 503 channel display will remain continuously illuminated and stop pulsing. The voltage on line 30 will cause the voltage from the inverter 105 to be removed from the AND gate 135 thereby removing the input to buzzer B1 on line 32. The voltage from the hook switch W4 on line 30 will provide a continuous voltage to the OR gate 111 which will cause the LED display to continuously display the number corresponding to the channel unit C and the D light to remain continuously illuminated.

Figure 4:
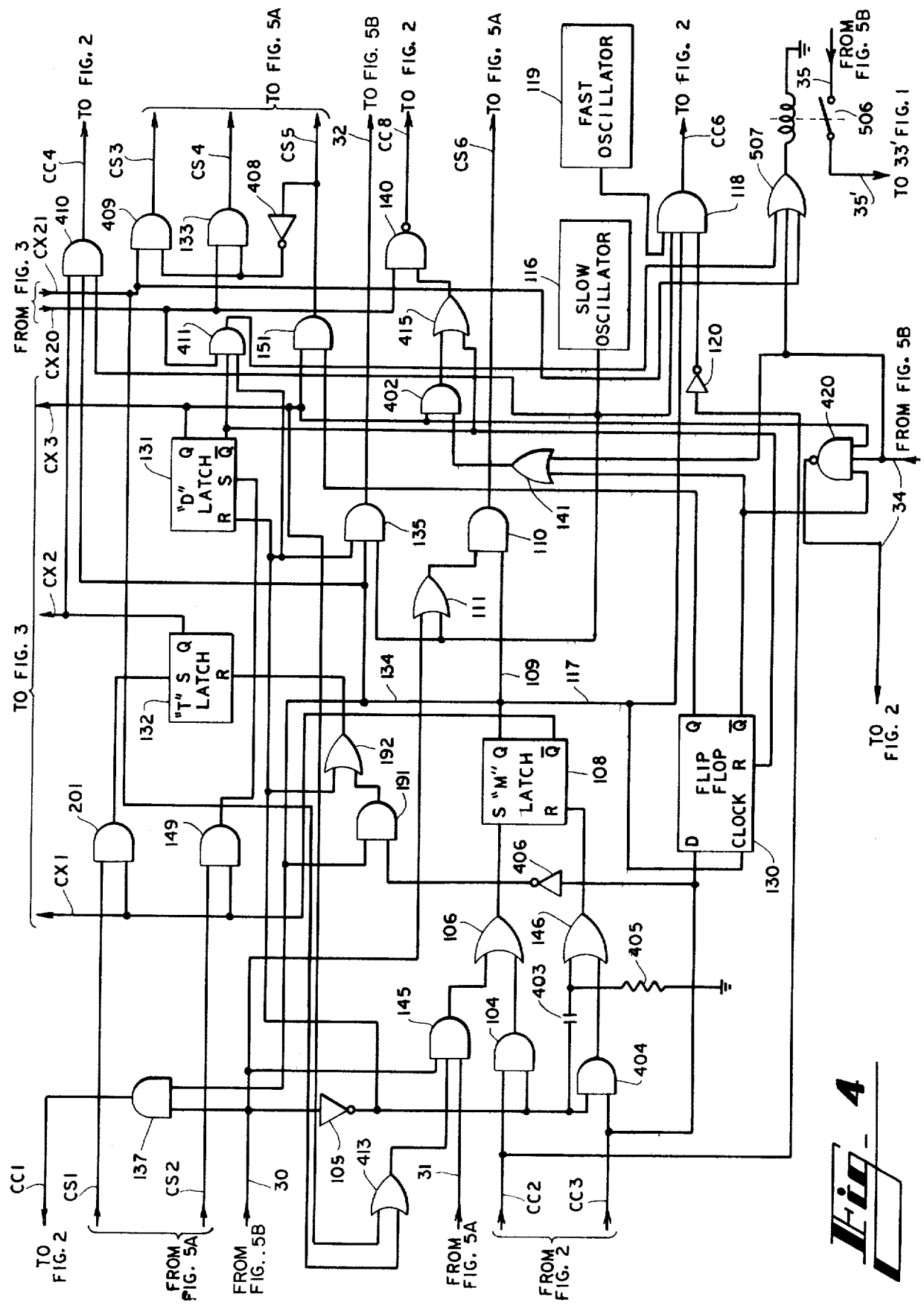
FIG. 4 is a circuit diagram of the function control device in the embodiment of the invention shown in FIG. 1.

The voltage provided by the removal of the phone P2 from the hook switch W4 at this central control unit S causes the dictator at the dictate station D1 to be placed in functional connection with the supervisor at the central control unit S. The voltage on line 30 is provided to AND gate 137 also as shown in FIG. 4. The other voltage to the AND gate 137 is provided from the Q output of the latching circuit 108. Thus, upon the removal of the phone P2 from the hook switch W4 and the central control unit S, an output is provided through the AND gate 137 and a voltage is placed on the lead CC1 to the AND gate 138 in the channel unit C1 as shown in FIG. 2. The other input to the AND gate 138 is already present since it was provided by the voltage on the channel line 10a when the channel was conditioned or polled and remains while the function conditioning and enabling device X1 is latched by latch 108. The output of the AND gate 138 provides the base voltage for a transistor 210 which serves to provide ground to a relay 201 having its input provided by a voltage on line 20, which was necessarily present when the dictate station was polled or conditioned and which remains while the function conditioning and enabling device X1 is latched by latch 108.

Thus, is will be understood that the removal of the phone P2 from the hook switch W4 at the central control unit S has not only caused the LED channel display 503 and the D function light to cease flashing and the buzzer B1 to be discontinued, but has also energized the relay 201 in the particular channel unit C1. The energizing of the relay 201 in the channel unit C1 causes the switch S1 to operate to connect line 33', the audio line to and from the central control unit S, to the dictate station and the recorder. As has been described above, the audio line 33' is comprised of an audio line 33 for carrying audio signals to the central control station S and an audio line 35 for providing audio signals from the central control unit. While closing switch S1 completes the audio path for audio signals from the dictate station and recorder, the audio path along line 35 is not closed merely by closing switch S1, a second switch actuated by relay 506 in the function control device X2 must also be closed. The additional switch actuated by relay 506 is present in order to prevent inadvertent interruption of dictation by a call from the supervisor at the central control unit S; however, as described above, the relay 506 has actuated the relay and closed the switch in response to a call initiated by the dictator at the dictate station. Therefore, the audio paths between the central control station S and the dictate station in both directions are completed by the closing of switch S1.

In addition, the operation of relay 201 causes the switch S2 to operate to connect the lead CC8 from the function control device X2 to the recorder through the zener diode 223. When S2 is closed, the zener diode 223 provides means for fixing a DC voltage at the recorder at a level to maintain a seized condition in the standby mode of operation in response to a ground from inverted AND gate 140. The first input to AND gate 140 is the voltage on line CX20 indicating that a dictate station has been polled and latched. The other input to AND gate 140 is from the OR gate 415 which is responsive to the presence of a voltage on the $-Q$ output of "D" latch 132 which, as will be explained subsequently, indicates that the communication was initiated by the dictate station and not by the central control unit S. Thus, inverted AND gate provides a ground to zener diode 223 which seizes the recorder in the standby mode of operation.

Thus, as a result of the hand set at the central control unit S being removed from the hook switch W5, the signalling at the central control unit S has been discontinued and the audio circuit of the phone P2 at the central control unit S has been connected to the audio and control circuit of the dictate station D. Accordingly, a dictator at the dictate station D and a supervisor at the central control unit S may communicate concerning the dictation being recorded by the recorder R1 from the dictate station D or concerning other matters such as the priority of certain dictation.

Moreover, this communication between the dictate station D and the central control unit S cannot be interrupted from any other dictate station or from a transcribe station T1 or T2 until the communication is completed. This is because the operation of the BCD 305 will not resume until this communication is completed and because as explained elsewhere herein, it is necessary for the BCD 305 to operate and provide the polling conditions to the other channel units and to the dictate stations and transcriber stations electronically connected thereto.

The communication which has been established as described above will be terminated upon the handset P2 at the central control unit S being returned to its onhook position. This serves to remove the voltage from line 30 which in turns removes the voltage from the AND gate 137 where the result of removing the voltage from the AND gate 137 is that the voltage is removed from the AND gate 138 in the channel unit to cause the transistor 210 to remove the ground from the relay D and cause the switches S1 and S2 to return to their normal condition. The absence of the voltage on the line 30 when inverted by the inverter 105 also places a voltage on the OR gate 146 which provides an input to the reset input of latching circuit 108. Moreover, the input provided the OR gate 146 is created by the current charging the capacitor 403 through the register 405 in response to the change in voltage on the line to capacitor 403 from inverter 105; therefore, the input to OR gate 146 is merely a pulse of duration long enough for capacitor 403 to be charged. The reason that a pulse is desired to reset latch 108 is that the reset signal must not remain on the latch 108 while the phone P2 is onhook since a continuous signal would prevent subsequent callers from setting latch 108. As a result, the $-Q$ output changes from no voltage to voltage and the Q output changes from voltage to no voltage and the polling or conditioning process is resumed as described in Operation of the Function Conditioning and Enabling Device.

Moreover, the removal of the output from the Q output of the latching circuit 108 removes the enabling voltage from AND gate 110 to terminate the inputs to the LED channel display 503 and the D, T and M lights in the central control unit S.

Conditioning and Enabling Communication Between A Dictate Station or Recorder D1 or D2 and the Central Control Unit S by Operation of the Central Control Unit S In the absence of any communication or monitoring function, and even though dictation and transcribing functions are occurring as described above, communication between a dictate station D1 or D2 and the central control unit station S may be originated at the central control unit S by closing the switch DB, which most conveniently is a pushbutton mounted in the base of the central control unit S and marked with the letter D. The closing of the switch DB applies a voltage on the line CS2 to the AND gate 149 shown in FIG. 4.

Since the latching circuit 108 is in its reset condition in the absence of any communication or monitoring function, the latching circuit 108 has a voltage at its −Q output which is applied to the AND gate 149 as the other input. Thus, the closing of the switch DB at the central control unit S causes a pulse to pass through the AND gate 149 to the set input of the "D" latching circuit 32. This set input to "D" latching circuit 132 causes a voltage output at the Q output of the latching circuit 132 which is applied by a lead CX3 to the reset input of the toggled mode selection flip-flop circuit 303 where it causes the −Q output of the toggled mode selection flip-flop circuit 303 to become high and to remain high in spite of the toggle input from the BCD 305.

As described in the section Operation of the Function Conditioning and Control Device, the output from the −Q terminal of the toggled mode selection flip-flop 303 is applied by the line 20 as the input to all of the channel units C. In addition, the output from the −Q terminal of the toggled mode selection flip-flop 303 is applied by the lead CX20 to provide one input to AND gates 133 and 140. As will be described more fully below, in the case the condition of And gate 151 does not provide an output when the selected channel is polled and latched, as indicated by an input voltage from inverter 408, the voltage provided the AND gate 133 provides an output voltage on line CS4 to the D light of the central control unit S. However, as will be more fully explained, if the condition of the AND gate 151 is such that an output is provided when the selected channel is polled and latched, then an output voltage on line CS5 to the M light of the central control unit S will be provided and the output of the AND gates 133 and 140 will be inhibited by the absence of an input from inverter 408.

In addition to closing the switch S3, the supervisor closes a switch corresponding to the channel unit with which communication is desired. It will be noted from FIG. 4 that consistent with the embodiment of the invention disclosed herein being adaptable for use with from one to ten channel units, the switch 12 is one of ten switches. As described in the Operation of the Function Conditioning and Enabling Device, the switches 12a–12g are arranged in individual output lines of a one of ten decoder 501 which is receiving digital input signals over lines 18a-18d from the BCD 305.

Thus, it will be understood that when the switch 12a is closed, that a pulse will occur on the line 31 only upon a particular count of the BCD 305. More importantly, it will now be understood that the operation of the switch S2 and the operation of the switch 12a at the supervisor station S provide the unique "number" and "D" outputs which are necessary to condition or poll the dictate circuit electrically connected to a particular channel.

The closing of the switch 12a provides a voltage to the AND gate 145. Another input of this AND gate 145 is provided by the line 30 providing voltage from the off-hook condition of hook switch W4 at the central control unit S. The third input to AND gate 145 is provided by a voltage output from OR gate 410 which passes a voltage from the Q output of the D latch 132, indicating that a call from the central control unit to the dictate station connected to the selected channel has been initiated. In response to these three inputs, the AND gate 145 passes a voltage to capacitor 403 which provides a pulse during charging to the OR gate 106 and through the OR gate 106 to the set input of the latching circuit 108.

As explained above, the S input through the latching circuit 108 changes the voltage output from latching circuits 108 from −Q to Q and the voltage from the Q output causes the BCD 305 to discontinue counting at the particular count corresponding to the lead 12a at the central control unit S.

As explained in the section on Initiating Communication Between the Dictate Station and Central Control Unit S by the Dictator, the Q output from latching circuit 108 and the off-hook condition at switch W4 of central control unit S enable the AND gate 137 to provide a voltage on line CC1 which operates the relay 201 at the dictate station electrically connected to the polled or conditioned channel. In the case of initiation of communication by the supervisor at the central control unit S, the polled or conditioned channel which is latched by the function control device X2 will be the channel selected by the supervisor.

As explained above, the operation of the relay 201 operates switches S1 and S2. The closing of switch S1 connects the dictate station through line 1 and the recorder through line 5 with resistor 220, and capacitor 222. Capacitor 222 provides an audio path on line 33' to and from the central control unit S. Resistor 222 provides a means of charging the DC level on the line 34 to the recorder in order to provide functional control of the recorder by the PTT switch W5. When switch 52 is closed, the zener diode 223 provides means for fixing the DC voltage at the recorder at a level to maintain a seized condition in the standby mode of operation in response to a ground from inverted AND gate 140.

When the supervisor at the central control unit S initiates a communication connection with a dictate station, the initial connection will be in the monitoring mode of operation if a dictation station is seized of the dictation recorder on the selected channel. If, however, the dictation recorder is not already seized by a dictation station, then the supervisor at the central control unit S will be connected in the dictate mode of operation, i.e., the central control unit S will seize the available dictation recorder at the selected channel. The purpose for the monitor mode is to prevent a supervisor at the central control unit S from inadvertently seizing the recorder from a dictator before the dictation can be conveniently interrupted. Thus, in order to seize the recorder when the connection of the central control unit S with the dictate station is in the monitor mode, the supervisor must operate an additional switch W5 at the central control unit to seize the recorder and communicate with the dictate station. This switch is most conveniently operated by a slide button on the hand set at the central control unit S.

The seizure of the recorder by the central control unit S occurs when a "zero" output from the inverted AND gate 140 is provided through the closed switch S2 and zener diode 223 to the recorder to provide a condition which disables the dictation recorder for recording information such as dictation while still retaining it in the seize condition. One of the inputs to inverted AND gate 140 is provided by the −Q output from toggled mode selection flip-flop 303 and is present whenever a dictate station has been polled and latched by the function conditioning and enabling device X1 and the function control device X2. The second input to inverted AND gate 140 is provided by OR gate 415. As described in connection with initiation of communication by a dictate station, one input to OR gate 415 is the −Q output of "D" latch 132 indicating that the dictate station initiated the communication and therefore it is permissible to put the recorder into a standby mode of operation as soon as the supervisor at the central control station S removes the phone P2 off-hook. Another input to OR gate 415 is provided through AND gate 402 in response to (1) an input from the Q output of D latch 132, indicating a call from the central control unit S to the dictate station at the selected channel, and (2) an input from OR gate 141. OR gate 141 will provide an output in response to either a signal on line 34 from the PTT switch W5 at the central control unit S or a signal or from the −Q output of flip-flop 130. As will be described, a −Q output will remain on flip-flop 130 unless a dictate station already has seizure on the recorder when the channel is latched by the function control device X2 therefore seizure by the central control unit S occurs whenever a −Q output is provided by flip-flop 130. The supervisor may then record by conventionally operating PTT switch W5 which places a voltage in line 34 which, along with the Q output of "D" latch 131 and −Q output of flip-flop 130 to inverted AND gate 420, causes a control voltage on line 34 across resistor 220 to the recorder to place the recorder in the record mode of operation and thereby enable recording by the supervisor. If, however, the recorder has already been seized by a dictate station, then a −Q output from flip-flop 303 will not be present and recording by the supervisor will not be possible. It will now be understood by those skilled in the art that seizure of the recorder by the central control unit S occurs (1) when the switch W5 is operated by the supervisor at the central control unit S if a dictate station was seized of the recorder when the channel was latched; and (2) when the channel is latched if no dictate station was seized of the recorder at the time the channel was latched.

As has been described above, the presence or absence of a −Q output from latch 130 determines whether the central control unit seizes the recorder at the selected channel immediately upon the channel being latched. Latch 130 is provided a clock input from the Q output of latch 108 such that latch 30 may only change condition in response to set or reset signals which coincide with the setting or resetting of latch 108. The reset input to latch 130 is the −Q output of "D" latch 132; therefore, latch 130 may only be set during a call from the central control unit S to a dictate station. In this manner, the latch 130 is prevented from affecting the operation of the function control device X2 during other than operations herein described. The set input to the latch 130, which must be provided when a dictate station has already seized the recorder at the selected channel, in response to a voltage on line CC3 from the channel unit. A voltage is placed on line CC3 at the channel unit in response to an output signal from AND gate 206 through OR gate 205. AND gate 206 provides an output when (1) the selected channel has been polled as indicated by a voltage on line 109; (2) the output of toggled mode selection latch 303 indicates that dictate stations are being polled as indicated by a voltage on line 20; and (3) the dictate station is providing a low to transistor 212, indicating that it is off-hook, and thereby providing a one on line 224 to the AND gate 206. It will now be understood that latch 130 will be set and will provide a Q output whenever a dictate station has already seized the recorder at the time the selected channel is latched by latch 108. Conversely, a −Q output from latch 130 will be provided to give the calling supervisor at the central control station S seizure of the recorder at the selected channel whenever a dictate station has been called, but no dictate station has seizure of the recorder at the time of the call.

As will be described, at the termination of communication, the supervisor places the phone P2 at the central control station S on-hook thereby eliminating the voltage on line 30 and again creating an output voltages from inverter 105. This hang-up causes the latch 108 to be reset and the "D" latch 132 to be reset such that a −Q output from latch 108 is provided latch 130 as a clock input and a −Q output from "D" latch 132 is provided latch 130 as a reset input. In this manner, the latch 130 is reset upon the termination of the call from the supervisor at the central control unit S and is ready for subsequent operation.

The function lights at the central control unit S will give a visual indication to the supervisor of whether the connection to the selected channel has been accomplished in the dictate mode or the monitor mode. As has been previously described, the AND gate 133 in the function control device X2 provides a voltage to line CS4 which is carried to the D function light at the central control unit causing the D function light to be illuminated when powered by transistor 115. As has also been described, the transistor 115 is powered by a voltage on line CS6 from AND gate 110 in the function control device X2 indicating, in the case of connection initiated by the supervisor at the central control unit S, that the supervisor phone P2 is off-hook and that the selected channel has been latched by setting latch 108.

The inputs to AND gate 133 determine whether the D light is to be illuminated or whether, as will be further described, the M light is to be illuminated. The first input to AND gate 133 is a voltage on line CX20 indicating that the toggled mode selection flip-flop 303 in the function conditioning and enabling device X1 has provided a −Q output thereby conditioning connection between the central control unit S and a dictate station electrically connected to channel unit S1. The second input to AND gate 133 is a voltage provided by inverter 408. A voltage from inverter 408 indicates that there is no voltages on line CS5 to the M function light.

The M function light is illuminated by the presence of a voltage on line CS5 from AND gate 151. The M function light is also powered by transistor 115, described above. The inputs to AND gate 151 are the Q output of the "D" latch which is provided whenever the supervisor initiates connection with a dictate station by pressing button DB at the central control unit S and the selected channel has been latched by setting latch 108, and the Q output of flip-flop 130 which indicates that a dictate station was seized of the recorder on the selected channel at the time the channel was latched by setting latch 108. It will now be understood that the M function light will be illuminated under the conditions which connect the supervisor at the central control unit S to the channel unit C1 in the monitor dictation mode, and that any connection between the central control unit S and the recorder of the channel unit C1 under any other conditions will fail to illuminate the M function light thereby illuminating the D function light indicating connection with the recorder in the dictate mode.

It will be further understood that, if a dictate station was seized of the recorder when the channel was latched, upon the release of the switch W5, the seize condition at the channel unit C is terminated and the recorder is returned to the control of the dictate station D for further recording of information such as dictation by the dictate station D. However, the central control unit S will continue to monitor this recording of information such as dictation until such time as the hand set P2 is returned to its on-hook position at the central control unit S and the hook switch W4 is again opened.

When this occurs, it will be seen from FIG. 3 that the high is provided through the inverter 105 through capacitor 403 to the OR gate 146 which in turn provides a reset pulse input to a latching circuit 108. As previously explained, this reset voltage causes the output voltage of the latching circuit 108 to be transferred from the Q output to the −Q output to cause the termination of the illumination of the LED channel display 503, and the M light and resumption of polling or conditioning by the function conditioning and control device X1. It will also be understood that upon hang-up the "D" latch 132 will be reset to provide a −Q output. This −Q output will provide a reset input to flip-flop 130 causing it to be reset to provide a −Q output.

Conditioning and Enabling of Communication Between a Transcriber Station T1 or T2 and the Supervisor Station S by Operation of the Supervisor Station In the absence of a communication or monitoring function and even though the recording system is being used for the recording or transcribing of information such as dictation, communication between a transcriber station T1 or T2 and the central control unit S may be initiated by the supervisor at the central control unit S. The connection is provided by the supervisor (1) removing the phone P2 from the cradle at the central control unit S thereby closing hook switch W4 and placing a voltage on line 30; (2) closing switch TB, which is most conveniently a pushbutton on the central control unit panel, thereby setting the "T" latch which in turn sets the toggled mode control latch 303 and causing polling or conditioning of only transcribe stations electrically connected to the polled channels; and (3) operating the channel select switch 12a–12g corresponding to the desired channel thereby enabling that channel to be latched by the function control device X2 when it is next polled or conditioned by the function conditioning and enabling device X2.

The operation of the hook switch W4 provides a voltage on line 30 to one of the inputs to the AND gate 145.

The closing of switch TB while the function conditioning and enabling device is polling the various channels sets the "T" latch 131 by providing an input through AND gate 401 from switch TB along CS and from the −Q output of latch 108 which is present during polling. The setting of "T" latch 131 causes a Q output at "T" latch 131 to be provided as a set input at toggled mode control flip-flop 303. Setting toggled mode control flip-flop 303 provides a Q output on line 14. As described in Operation of the Function Conditioning and Enabling Device a Q output at toggled mode control flip-flop 303 causes polling or conditioning of only transcriber stations at polled channel units, in the same manner as the −Q output causes polling or conditioning of only dictate stations at the polled channel units. As also explained in the Operation of the Function Conditioning and Enabling Device, the operation of a switch 12a–12g by the supervisor provides a second input on line 31 to the AND gate 145 when the BCD 305 has conditioned the channel corresponding to the switch 12a–12g selected by the supervisor. Finally, OR gate 413 provides a third input to AND gate 145 in response to the Q output of toggled mode selector latch 303 which is present on line 14.

The three voltages to the AND gate 145 provide a signal to the OR gate 106 which in turn provides a signal to the set input of the latching circuit 108 to cause the latching circuit to change from its Q output to its −Q output. As explained in the Operation of the Function Conditioning and Enabling Device, the loss of the −Q output from the latch 108 stops the polling of the channels immediately thereby latching the polling operation at the channel which the supervisor had selected by closing the desired switch 12a–12g. In addition, the toggled mode selection flip-flop 303 has been set to poll only transcribe stations therefore the function control device not only has latched the selected channel, but also the transcriber station connected to that channel.

The Q output from latch 108 combines at the AND gate 110 with the voltage on line 30 caused by the closing of the hook switch W4 at the central control unit S to provide an output voltage on line CS6 to power transistor 115. Transistor 115 provides illumination of the selected channel number on the LED channel display 503 at the control unit S. In addition, transistor 115 also illuminates the T function light at the central control unit when the circuit CS3 between the AND gate 409 and the transistor 115 receives a voltage from AND gate 409. AND gate 409 will provide a voltage to illuminate the T function light in response to the Q output from toggled mode selection flip-flop 303 and a voltage provided by the inverter 408 indicating that the "M" light has not been illuminated.

The transcriptionist at the transcriber station is alerted to the supervisor's call from the central control unit by the operation of a buzzer B2 at the transcriber station. The buzzer B2 is operated by the presence of a voltage at the channel unit on line 8. A voltage is placed on line 8 in response to the presence of a voltage on CC4 from the function control device X2 and the closure of switch S3 by relay 202 in response to the transcribe station on the selected channel being latched by the function control device X2.

The voltage on CC4 necessary to operate the transcriber station buzzer B2 is provided by the output of AND gate 410 in the function control device X2. The inputs to the AND gate 410 are provided by: (1) The Q output from the "T" latch 131 indicating that the "TB" switch has been closed by the supervisor at the central control unit S; (2) the Q output from latch 108 indicating that the selected channel has been latched; and (3) the output of the slow oscillator 113. It will be understood by those skilled in the art that voltage alternately on and off will be provided on line CC4 to the transcriber station on the selected channel as a result of the output of AND gate 410.

The switch S3, which must be closed in order to provide the line voltage on CC4 to the transcriber station buzzer B2, is operated by relay 202. The inputs to relay 202 are provided by a voltage on line 14 indicating that the transcriber station at the selected channel has been polled by the function conditioning and enabling device X1 and a lesser voltage on line 221 from transistor 210. The lesser voltage on line 221 indicates that an output is present at AND gate 138. The inputs to AND gate 138 are, as has been previously described, provided by a voltage on line 10a indicating that the channel unit has been polled and conditioned and voltage on CC1 indicating that the supervisor phone P2 is off-hook and the function control device has latched the channel.

It will now be understood that the transcriber buzzer is actuated when a call from the supervisor and the central control unit S to the transcriber station is initiated by pressing the pushbutton TB and a channel button. This signal continues until the transcriptionist removes the hand set P1 at the transcriber station from the cradle placing switch W3 in the off-hook condition. Since placing switch W3 in the off-hook condition closes the switch to ground, a low voltage condition is placed on line 6. This low voltage condition on line 6 terminates the output from AND gate 161. The termination of the output from AND gate 161 terminates the output on line CC2 from OR gate 101. Referring now to FIG. 4 showing the function control device X2, the absence of a voltage on line CC2 is inverted at inverter 406 to provide an output voltage from inverter 406. The output from inverter 406 is combined with the Q output of latch 108 at AND gate 191 to provide an output from AND gate 191, through OR gate 192, to the reset of "T" latch 131. The reset input at "T" latch 131 changes the output of "T" latch 131 from Q to −Q. As described above, the Q output from "T" latch 131 is a necessary condition for the operation of the buzzer B1 through AND gate 410; therefore, its termination terminates the operation of the buzzer B1.

The supervisor may also monitor the dictation being reproduced for transcription at the transcription station without actuating the buzzer B1 and alerting the transcriptionist or requiring the transcriptionist to remove the hand set P1 from the on-hook condition. This is accomplished by the supervisor removing the hand set P2 at the central control unit and operating the switch 12a-12j corresponding to the channel that is desired to be monitored. The removal of the hand set P2 slows a voltage in line 30 as has been described above. The closing of the switch 12a-12j corresponding to the channel that is desired to be monitored places a voltage on line 31 which is combined at AND gate 145 with the voltage already placed on line 30. The other input to AND gate 145 is provided by OR gate 413 which provides an output to the AND gate 145 in response to (1) a Q output on toggled mode selection latch 303, which indicates that transcribe stations are being polled or conditioned on that cycle of function conditioning and enabling device X1, or (2) to a Q output from "D" latch 132 indicating that the switch DB has been closed. Thus, it will be understood that the central control unit may be connected to the transcribe station at a selected channel merely by removing the hand set P2 and closing the desired switch 12a-12j corresponding to the desired channel. It will be further understood that this operation does not cause the buzzer 131 at the transcriber station to be actuated.

As has been described above, the relay 202 at the channel unit C1 is operated to close switch S3 when the function control device X1 latches the transcribe station at the selected channel. The operation of relay 202 also closes switch S4 when operated in this manner. The closing of switch S4 completes the circuit along audio line 33 from the hand set P1 at the transcriber station to the hand set P2 at the central control unit S. In addition, the relay 506 on line 35 will have been closed by the presence of the Q output at toggled mode selection latch 303 which will have provided a voltage to relay 506 through OR gate 507. Thus, the closing of switch S4 will also complete the audio circuit on line 35 from the handset P2 at central control unit S to the hand set P1 at the transcriber station. It will now be understood that communication along lines 33 and 35 between the central control unit S and the transcriber station is possible. It will also be understood by reference to FIG. 1 that the line 6 to the transcriber station is connected to both the transcriber phone P1 and the output from the recorder to the transcriber station. Therefore, the signals from the recorder to the transcription station may be monitored by the central control unit through line 33 along with communication from the transcriber hand set P1.

When the necessity for communication between the transcriber station and the central control unit S has ended, the phone P1 at the transcriber station may be returned to its on-hook position while leaving the phone P2 at the central control unit S still connected to line 6 through audio lines 33 and 35. Thus, even though the phone P1 at the transcriber station T has been returned to its on-hook position, the central control unit S may continue to monitor the transcribing of information at the transcriber station T.

If it is not desired to monitor the transcribing information at the transcriber station T upon the termination of communication between the transcriber station T and the central control unit S, the phone P2 at the central control unit S is returned to its on-hook position. As explained previously, the returning of the phone at the central control unit S to its on-hook position opens switch W4 and provides the input through the inverter 105 through capacitor 403 to provide a pulse to the OR gate 146. As explained above, the pulse from the OR gate 146 causes the latching circuit 108 to be reset so that the voltage is removed from Q output and appears at the −Q output. As previously explained above, the removal of the voltage from the Q output and the appearance of the voltage at the −Q output of the latching circuit 108 causes the BCD 305 to resume counting, causes the relay output CC1 to the channel units C1 and C2 to terminate and causes the LED channel display 503 and the T function light to cease to be illuminated. The recording system is thus in condition for a new communication or monitor function to be originated. However, it will be understood that the foregoing described communication or monitor function involving a transcriber station T has in no way interfered with the recording of information such as dictation on a recorder R1 or R2 from a dictate station D or D'.

The Originating of Communication Between a Transcriber Station T1 or T2 and the Supervisor Station S by Operation of the Transcriber Station T1 or T2

In the absence of any other communication or monitor function and even though the recording or transcribing of information such as dictation is occurring, communication between a transcriber station T1 or T2 and the central control unit S is originated at a transcriber station T1 or T2 by the operation of a switch W2. This switch is most conveniently a switch on the hand set at the transcriber station T1 or T2 but may be any other convenient means for providing a voltage on the line 7 to the channel unit C. In the channel unit C the voltage provided by the operation of the switch W2 is applied as one of the enabling voltage to an AND gate 161. The second enabling voltage for the AND gate 161 is the Q output on line 14 of the toggled mode selection latch 303 of the function conditioning and enabling device X1, and the third enabling voltage for the AND gate 161 is the channel select output 10a of the function conditioning and enabling device X1.

As described in the Operation of the Function Conditioning and Enabling Device, the voltages on lines 14 and 10a are provided when the function conditioning and enabling device is polling the transcribe stations electrically connected to the channels. When voltages on lines 14 and 10a are so provided, the AND gate 161 is enabled to pass the signal resulting from the operation of the switch W2 at the transcriber station T. When passed through the AND gate 161 at this particular time the signal originated by the operation of the switch W2 at the transcriber station T passes through the OR gate 101 in the channel unit C to the AND gate 104 in the function control device X2. If the phone P2 at the central control unit S is on-hook, there is a second enabling voltage through the inverter 105 to the AND gate 104 and as a result the operation of the switch W2 at the transcriber station T will cause a signal through the OR gate 106 to the set input of the latching circuit 108. As with the prior communication and monitor functions described above, the set input to the latching circuit L1 removes the −Q output to terminate the polling operation of the BCD 305 and provides a Q output which provides a flashing LED channel display 503 and a pulsating buzzer B2 at the central control unit S in the same manner as the latching of the latching circuit 108 by the operation of the switch W1 at a dictate station D. However, since the latching circuit 108 was latched at a time coinciding to a transcriber poll input on line 14 to the channel unit C, the output from the toggled mode selection flip-flop 303 is to the AND gate 409 rather than to the AND gate 133 and it is the light T rather than the light D which is flashing at the supervisor station S.

As with a communication originated at a dictate station D, the removal of the hand set P2 at the central control unit S from its cradle provides a voltage on the hook switch circuit 34 to the function control device X2 which, as with a function originated by the operation of the switch W6 at a dictate station D causes the operation of the buzzer B2 at the central control unit S to terminate and causes the LED channel light and the function light T at the central control unit S to be continuously illuminated rather than pulsate. In addition, as with the operation of the switch W1 at a dictate station D, the central control unit S hook switch voltage on line 30 combined with the Q output of the latching circuit 108 provide a relay voltage on line CC1 to the channel unit C. However, since it was coincidence with a voltage on line 14 rather than a voltage on line 20, it is relay 202 which is energized in the same manner as it was energized in connection with communication between transcriber station T1 or T2 and the central control unit S when the communication was initiated at the central control unit S.

Similarly, upon the hand set P2 at the central control unit S being removed from its cradle, the audio lines 33 and 35 between the transcriber station T associated with the particular channel unit C1 or C2 and the central control unit S are connected for communication between the transcriber station T and the central control unit S as described in connection with such communication initiated by the central control unit S. Moreover, it will be understood that the same monitor functions of information being transcribed at a transcriber station T1 or T2 can be accomplished with this communication function of the invention as with the function originating at the central control unit S.

The foregoing description of the preferred embodiment is intended to provide only an exemplary embodiment of the present invention; the scope of the present invention is limited solely by the appended claims.

What is claimed is:

1. In a recording system having a plurality of dictate stations; a plurality of recorders; and a plurality of first audio circuits arranged to operatively connect said plurality of dictate stations with said plurality of recorders for the recording of dictation;

a central control unit having a second audio circuit;

a conditioning means having a polling mode of operation and for alternately and in predetermined sequence providing an intermittent condition within said recording system with respect to each of said plurality of first audio circuits when said conditioning means is in said polling mode of operation;

a function selecting means associated with said central control unit and selectively operable to provide a function signal condition corresponding to a selection of a particular one of said plurality of first audio circuits for one of a plurality of functions operatively connecting said second audio circuit and said one of said plurality of first audio circuits in response to said channel function signal condition coinciding with said intermittent condition with respect to one of said plurality of first audio circuits;

a function enabling means for rendering said recording system operative to provide said one of a plurality functions in response to said channel function signal condition coinciding with said intermittent condition with respect to one of said plurality of first audio circuits;

function control means for terminating said polling mode of operation of said conditioning means in response to the establishment of said one of a plurality of functions by said function enabling means and for reestablishing said polling mode of operation of said conditioning means in response to termination of said one of a plurality of functions.

2. The recording system of claim 1 including a first communication means for audio signals to pass from said one of said plurality of first audio circuits to said second audio circuit and including a second communication means for audio signals to pass from said second audio circuit to said one of said plurality of first audio circuits.

3. The recording system of claim 2 in which said one of said plurality of first audio circuits is operatively connecting one of said plurality of dictate stations and one of said plurality of recorders for the recording of dictation and including disabling means for rendering said one of said plurality of recorders inoperative for the recording of dictation when said second communication means is operative.

4. The recording system of claim 3 in which said one of said plurality of recorders is operative to provide a ready tone to said one of said plurality of dictate stations when said one of said plurality of recorders is enabled to record dictation and in which said disabling means renders said one of said plurality of recorders inoperative to provide said ready tone.

5. The recording system of claim 2 in which said one of said plurality of first audio circuits is operatively connected to one of said plurality of recorders and in which said second communication means renders said one of said plurality of recorders operative to record audio signals passing from said second audio circuit to said one of said plurality of first audio circuits.

6. The recording system of claim 1 in which said central control unit includes a signaling means for providing an auditory signal which becomes operative in response to said function enabling means being operative and which subsequently becomes inoperative in response to said function control means being operative.

7. The recording system of claim 1 in which said central control unit includes a signal means operative to provide a visual signal and in which said visual signal is flashing in response to said function enabling means being operative and is subsequently steady in response to said function control means being operative.

8. The recording system of claim 1 in which said intermittent condition provided by said conditioning means is a first intermittent condition, in which said function selecting means is a first function selecting means, and including:
a plurality of phones and a plurality of third audio circuits, each operatively connected to one of said plurality of phones;
a second function selecting means for selecting one of said plurality of third audio circuits for a function when said conditioning means is providing a second intermittent condition, said function enabling means being responsive to said second function selecting means to enable the function selected thereby.

9. The recording system of claim 8 including a fourth audio circuit constructed and arranged to hear dictation previously recorded on a recorder and a connecting means for operatively connecting said fourth audio circuit and said one of said plurality of third audio circuits.

10. In a recording system having a plurality of dictate stations operable to record dictation with a plurality of recorders:
a plurality of channel units, each constructed and arranged to provide a first audio circuit between one of said plurality of dictate stations and one of said plurality of recorders;
a central control unit having a second audio circuit;
conditioning means for alternately and sequentially providing a selecting condition at each of said plurality of channel units;
function selecting means selectively operable for providing an enabling signal which is uniquely characteristic of one of a plurality of functions for one of said plurality of channel units;
function enabling means responsive to the simultaneous occurrence of said enabling signal and said selecting condition at said one of said plurality of channel units for enabling said recording system to establish said one of a plurality of functions operatively connecting said second audio circuit and said first audio circuit of said one of said plurality of channel units;
function control means for terminating operation of said conditioning means in response to the establishment of said one of a plurality of functions by said function enabling means and for the establishing of said operation of said conditioning means in response to termination of said one of a plurality of functions.

11. The recording system of claim 10 including a signaling means responsive to said function enabling means becoming operative for providing a first signal for indicating that said recording system has been enabled by said function enabling means for said function.

12. The recording system of claim 11 including signal altering means for changing said first signal to a second signal in response to said control means initiating said function.

13. The recording system of claim 10 including reset means for causing said enabling means to become inoperative in response to a reset signal.

14. The recording system of claim 13 in which said reset signal is a first reset signal, in which said reset means is responsive to said first reset signal when said control means has not initiated said function, and in which said reset means is responsive to a second reset signal when said control means has initiated said function.

15. The recording system of claim 10 in which said function selecting means is a first function selecting means and including a second function selecting means and a busy means for providing a busy signal in response to the operation of said second function selecting means when said function enabling means is operative.

16. The recording system of claim 10 including a function disabling means for rendering said function enabling means inoperative in response to said enabling signal.

17. The recording system of claim 16 including a busy signal means for providing a busy signal in response to said function disabling means being operative.

18. The recording system of claim 10 in which said function is an audio communication function, in which said second audio circuit is operatively connected to said first audio circuit at said one of said plurality of channel units, and including recorder disabling means for rendering one of said plurality of recorder operatively connected to said first audio circuit at said one of said plurality of channel units inoperative to record dictation.

19. The recording system of claim 10 in which said function is a first function and in which said function enabling means is responsive to a function altering means to enable said first function when one of said plurality of recorders is operative for the recording of dictation with said first audio circuit at said one of said plurality of channel units and to enable a second function when said one of said plurality of recorders is inoperative.

20. The recording system of claim 19 including a communication enabling means for enabling the recording of dictation by said second audio circuit with said one of said plurality of recorders when said second function is enabled by said function enabling means.

21. The recording system of claim 10 including latching means responsive to said enabling signal for latching said enabling means in a mode of operation which continuously enables said recording system to provide said function.

22. The recording system of claim 10 in which said function enabled by said function enabling means is a communication function whereby audio signals are received by said second audio circuit at said central control unit from said first audio circuit at said one of said plurality of channel units and whereby audio signals cannot be transmitted from said central control unit to said first audio circuit at said one of said plurality of channel units, and including a communication enabling means for enabling the transmitting of audio signals from said central control unit to said first audio circuit at said one of said plurality of channel units.

23. In a recording system having a plurality of dictate stations operable to record dictation with a plurality of recorders:
- a plurality of channel units, each constructed and arranged to provide a first audio circuit between one of said plurality of dictate stations and one of said plurality of recorders;
- a central control unit having a second audio circuit;
- conditioning means for alternately and sequentially providing a selecting condition at each of said plurality of channel units;
- function selecting means selectively operable at said central control unit and each of said plurality of channel units for providing an enabling signal which is uniquely characteristic of one of a plurality of functions for one of said plurality of channel units;
- function enabling means responsive to the simultaneous occurrence of said enabling signal for said one of a plurality of channel units and said selecting condition at said one of said plurality of channel units for enabling said recording system to establish said one of a plurality of functions operatively connecting said second audio circuit and said first audio circuit of said one of said plurality of channel units;
- function control means for terminating operation of said conditioning means in response to the establishment of said one of a plurality of functions by said function enabling means and for the establishing of said operation of said conditioning means in response to termination of said one of a plurality of functions.

24. A dictation recording/transcribing system including a plurality of dictate stations operable to record dictation with a plurality of recorders comprising:
- a plurality of channel units, each constructed and arranged to provide a first audio circuit between one of said plurality of dictate stations and one of said plurality of recorders;
- a central supervision unit including a second audio circuit;
- a multiplexed enabling means for providing N enabling states, one at a time, within said system when said enabling means is in a polling mode;
- each of said N enabling states corresponding to one of a plurality of audio functions wherein said second audio circuit is operatively connected to a particular one of said plurality of first audio circuits;
- a function selecting means selectively operable from said central supervision unit and each of said plurality of channel units for providing one of N selection states, said N selection states corresponding to said N enabling states;
- function enabling means for establishing a particular one of said plurality of audio functions and for terminating said polling mode of said enabling means in response to the simultaneous occurrence of a particular one of said N selection states and a particular one of said N enabling states corresponding to said particular one of said plurality of audio functions;
- function control means for causing said enabling means to maintain said particular one of said N enabling states in response to said function enabling means and for terminating said particular one of said plurality of audio functions and for causing said enabling means to reestablish said polling mode in response to a selectively operable termination signal.

* * * * *